(12) United States Patent
Matsuzaki et al.

(10) Patent No.: US 8,821,726 B2
(45) Date of Patent: Sep. 2, 2014

(54) SUBMERGED MEMBRANE SEPARATOR

(75) Inventors: Yoshio Matsuzaki, Amagasaki (JP);
Tatsuya Uejima, Amagasaki (JP);
Tomohiko Sasaki, Amagasaki (JP);
Kimihiro Ishikawa, Amagasaki (JP)

(73) Assignee: Kubota Corporation, Osaka (JP)

( * ) Notice: Subject to any disclaimer, the term of this patent is extended or adjusted under 35 U.S.C. 154(b) by 675 days.

(21) Appl. No.: 12/746,949

(22) PCT Filed: Nov. 27, 2008

(86) PCT No.: PCT/JP2008/003485
§ 371 (c)(1),
(2), (4) Date: Jun. 9, 2010

(87) PCT Pub. No.: WO2009/075067
PCT Pub. Date: Jun. 18, 2009

(65) Prior Publication Data
US 2010/0282655 A1 Nov. 11, 2010

(30) Foreign Application Priority Data

Dec. 13, 2007 (JP) .................. 2007-321441

(51) Int. Cl.
*B01D 63/08* (2006.01)
*B01D 65/08* (2006.01)
*B01D 61/18* (2006.01)

(52) U.S. Cl.
CPC ............... *B01D 65/08* (2013.01); *B01D 61/18* (2013.01); *B01D 63/08* (2013.01); *B01D 2315/06* (2013.01); *B01D 2321/185* (2013.01)
USPC ................. 210/321.69; 210/636; 210/321.84; 210/321.75; 210/321.67; 210/241; 210/486; 210/650

(58) Field of Classification Search
None
See application file for complete search history.

(56) References Cited

U.S. PATENT DOCUMENTS

| 7,122,121 B1 * | 10/2006 | Ji | ............... 210/321.67 |
| 2006/0108289 A1 * | 5/2006 | Steele et al. | .................. 210/651 |
| 2010/0000935 A1 * | 1/2010 | Sakai et al. | .................... 210/455 |

FOREIGN PATENT DOCUMENTS

| JP | 03-188926 | 8/1991 | ............. B01D 61/14 |
| JP | 09-276868 | 10/1997 | ................ C02F 1/44 |
| JP | 11-057425 | 3/1999 | ............. B01D 63/08 |
| JP | 11-057426 | 3/1999 | ............. B01D 63/08 |
| JP | 2000-005573 | 1/2000 | ............. B01D 63/08 |
| JP | 2008-237960 | 10/2008 | ............. B01D 63/08 |
| WO | WO 2007/122839 | 1/2007 | ............. B01D 63/00 |

OTHER PUBLICATIONS

Int'l Search Report from corresponding Int'l Patent Application No. PCT/JP2008/003485, 2 Pages.
Supplementary European Search Report from corresponding European Patent Application No. EP 08 86 0780, 2 Pages.

* cited by examiner

Primary Examiner — Krishnan S Menon
(74) Attorney, Agent, or Firm — Kusner & Jaffe

(57) ABSTRACT

A submerged membrane separator 31 includes: a casing 33 opened at the top; a plurality of flat membrane cartridges 34 arrayed at intervals in the casing 33; and an air diffuser 36 provided below the membrane cartridges 34. The membrane cartridges 34 are movably held in the up-down direction in the casing 33 while having a space α in the up-down direction. Lifting suppressing members 63a and 63b for restricting a lifting amount of the membrane cartridges 34 during filtration operation to be smaller than the space α in the up-down direction are provided in the casing 33.

11 Claims, 23 Drawing Sheets

SUBMERGED MEMBRANE SEPARATOR

TECHNICAL FIELD

The present invention relates to a submerged membrane separator to be submerged and arranged in, for example, a liquid to be treated such as an activated sludge mixture in a treatment tank.

BACKGROUND ART

Conventionally, as a submerged membrane separator 1 of this type, there has been a submerged membrane separator that is submerged in a treatment tank and separates activated sludge and treated water as shown in FIG. 21. The submerged membrane separator 1 includes a box-type casing 2 opened at the top and the bottom, a plurality of membrane cartridges 3 arrayed in parallel to one another in the casing 2, and an air diffuser 4 provided below the membrane cartridges 3.

The membrane cartridges 3 have filtration plates 12 and filtration membranes 13 attached to both sides of the filtration membranes 12. The air diffuser 4 is configured to diffuse air from a diffusion pipe. A pressing plate 5 for preventing lifting of the membrane cartridges 3 is attached to the upper part of the casing 2.

Consequently, during a filtration operation, the inner sides of the membrane cartridges 3 are depressurized while air is diffused from the air diffuser 4. Therefore, sludge or the like in a liquid to be treated is caught by the filtration membranes 13 of the membrane cartridges 3. Permeate permeating through the filtration membranes 13 and flowing into the inner sides of the cartridges 3 is collected as treated water 19 in a water collecting pipe 16 from water intake nozzles 14 through connection pipes 15.

In this case, upflow 17 is caused among the membrane cartridges 3 by bubbles of the air diffused from the air diffuser 4. Matters adhering to the membrane surfaces of the membrane cartridges 3 are removed by this upflow 17. At this point, an upward force acts on the membrane cartridges 3 due to the upflow 17. However, the membrane cartridges 3 can be prevented from being lifted owing to the pressing plate 5.

However, since there is a space between the upper end of the membrane cartridge 3 and the pressing plate 5, unfortunately, the upper end of the membrane cartridge 3 is brought into contact with the pressing plate 5 by the upflow 17, the membrane cartridge 3 minutely vibrates, and the upper end of the membrane cartridge 3 repeatedly comes into contact with the pressing plate 5 and is worn.

As a measure against the problem, as shown in FIG. 22, a pressing plate 6 is formed by a tabular supporting portion 7 and a comb-like pressing portion 8 of an elastic material bonded to the tabular supporting portion 7. The tabular supporting portion 7 is fixed to the upper end surface of the casing 2 by a bolt 9 and a nut 10. The comb-like pressing portion 8 has a plurality of protrusions 8a. The protrusions 8a are pressed into spaces between the membrane cartridges 3.

Consequently, the membrane cartridges 3 are pressed from above by the pressing plate 6 and are immovably secured. Therefore, it is possible to prevent vibrations of the membrane cartridges 3.

The submerged membrane separator including the pressing plate as explained is described in, for example, Japanese Patent Application Laid-Open No. H10-137556.

DISCLOSURE OF THE INVENTION

Problems to be Solved by the Invention

However, in the conventional form described above, as shown in FIG. 22, the vibrations of the membrane cartridges 3 are prevented by the pressing plate 6. Therefore, unfortunately, it is difficult to improve a cleaning effect for the membrane surfaces of the membrane cartridges 3 by the upflow 17.

The membrane cartridges 3 are forcibly pressed by the pressing plate 6 against a force to cause vibrations. Therefore, when the force to cause vibrations becomes excessively large, it is likely that the filtration plates 12 of the membrane cartridges 3 break.

It is an object of the present invention to provide a submerged membrane separator that can reduce the abrasion of membrane cartridges and improve a cleaning effect for the membrane surfaces of the membrane cartridges by upflow.

Means for Solving the Problems

In order to attain the object, a first invention is a submerged membrane separator including: a casing opened at the top; a plurality of flat membrane cartridges arrayed at intervals in the casing; and an air diffuser provided below the membrane cartridges, wherein the membrane cartridges are movably held in the up-down direction in the casing while having a space in the up-down direction, and a lifting suppressing member for restricting a lifting amount of the membrane cartridges during a filtration operation to be smaller than the space in the up-down direction is provided in the casing.

Consequently, during the filtration operation, upflow is generated among the membrane cartridges by bubbles of air diffused from the air diffuser. Matters adhering to the membrane surfaces of the membrane cartridges are removed by this upflow. At this point, an upward force acts on the membrane cartridges due to the upflow and the membrane cartridges are lifted with the upward force.

In this case, the lifting amount of the membrane cartridges is restricted by the lifting suppressing member to be smaller than the space in the up-down direction. Consequently, the membrane cartridges actively vibrate while being kept in a state in which the membrane cartridges are lifted within the range of the space in the up-down direction. Therefore, a cleaning effect for the membrane surfaces of the membrane cartridges is improved. Further, a contact portion between the membrane cartridges and a member fixed on the casing side is reduced, so that the abrasion of the membrane cartridges is reduced.

A second invention is the submerged membrane separator, wherein the membrane cartridges are movably held in the array direction of the membrane cartridges in the casing.

A third invention is the submerged membrane separator, wherein the lifting suppressing member restricts the lifting amount of the membrane cartridges in the side portion of the membrane cartridges.

A fourth invention is the submerged membrane separator, wherein the lifting suppressing member restricts the lifting amount of the membrane cartridges in the lower side portion of the membrane cartridges.

A fifth invention is the submerged membrane separator, wherein the lifting suppressing member restricts the lifting amount of the membrane cartridges in the upper side portion of the membrane cartridges.

A sixth invention is the submerged membrane separator, wherein the lifting suppressing member holds spaces between the membrane cartridges.

A seventh invention is the submerged membrane separator, wherein a portion of the lifting suppressing member that comes into contact with the membrane cartridges is an elastic member.

Consequently, when an upward force acts on the membrane cartridges due to the upflow, the portion of the elastic member of the lifting suppressing member is elastically deformed and the membrane cartridges are lifted. In this case, the lifting amount of the membrane cartridges is restricted to be smaller than the space in the up-down direction owing to the lifting suppressing member.

An eighth invention is the submerged membrane separator, wherein a fitting portion is provided in the side portion of the membrane cartridges, and the lifting suppressing member fits in the fitting portion.

A ninth invention is the submerged membrane separator, wherein an engaging portion is provided in the side portion of the membrane cartridges, and the engaging portion engages with the lifting suppressing member from below during a filtration operation.

A tenth invention is the submerged membrane separator, wherein the lifting suppressing member is attached to the frame body of the casing.

An eleventh invention is the submerged membrane separator, wherein the lifting suppressing member is attached to a side panel that surrounds both sides of the membrane cartridges.

Advantages of the Invention

As described above, according to the present invention, during the filtration operation, upflow is generated among the membrane cartridges by bubbles of air diffused from the air diffuser, an upward force acts on the membrane cartridges due to the upflow, and the membrane cartridges are lifted.

In this case, the lifting amount of the membrane cartridges is restricted to be smaller than the space in the up-down direction by the lifting suppressing member. Therefore, the membrane cartridges actively vibrate while being kept in a state in which the membrane cartridges are lifted within the range of the space in the up-down direction. Consequently, the cleaning effect for the membrane surfaces of the membrane cartridges is improved. The contact portion between the membrane cartridges and the member fixed on the casing side is reduced, so that the abrasion of the membrane cartridges is reduced.

When an upward force acts on the membrane cartridges due to the upflow, the portion of the elastic member of the lifting suppressing member is elastically deformed and the membrane cartridges are lifted. In this case, the lifting amount of the membrane cartridges is restricted to be smaller than the space in the up-down direction owing to the lifting suppressing member.

BEST MODE FOR CARRYING OUT THE INVENTION

A first embodiment in the present invention is explained below with reference to FIGS. 1 to 9.

Figure 1:
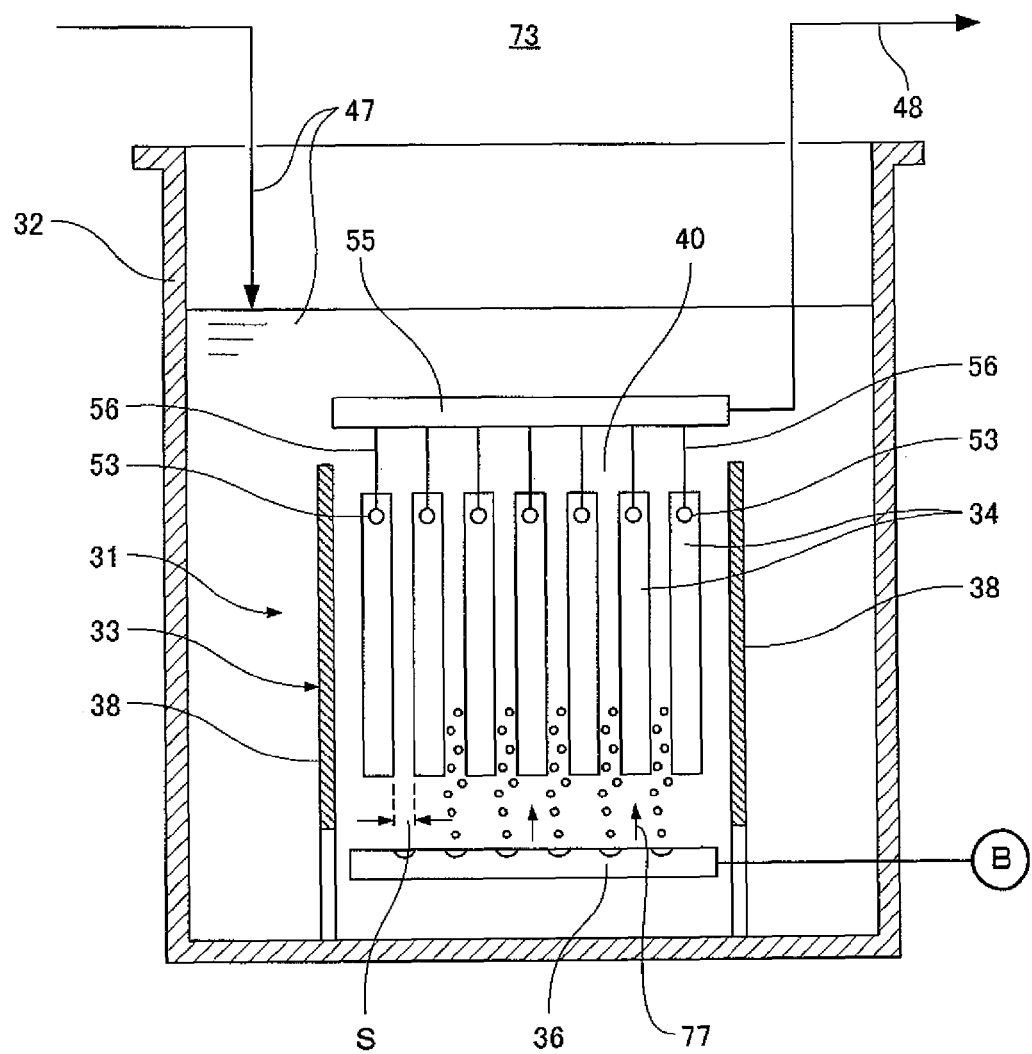
FIG. 1 is a longitudinal sectional view showing the configuration of a submerged membrane separator in a first embodiment of the present invention.

As shown in FIG. 1, reference numeral 31 denotes a submerged membrane separator. This submerged membrane separator 31 is submerged in a treatment tank 32 and separates raw water containing activated sludge and treated water. The submerged membrane separator 31 includes a box-type casing 33 for membranes opened at the top and the bottom, a plurality of flat membrane cartridges 34 arrayed in parallel and opposed to one another in the casing 33 for membranes, and an air diffuser 36 provided below these membrane cartridges 34.

The air diffuser 36 is an example of a flow generating device. The air diffuser 36 diffuses air from a plurality of diffusing holes formed in an air diffusion pipe to thereby generate upflow 77 along the membrane surfaces of the membrane cartridges 34.

Figure 2:
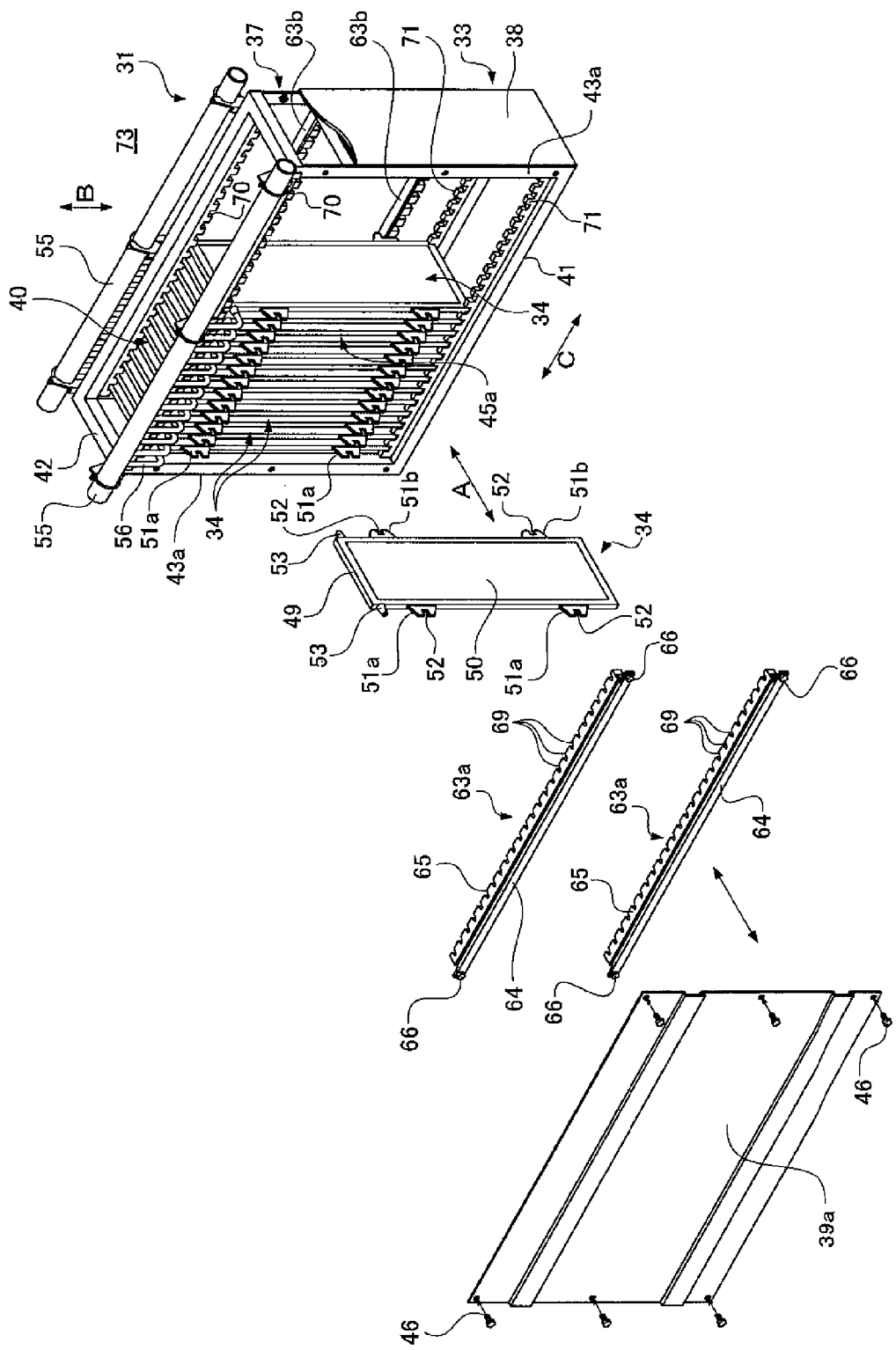
FIG. 2 is a perspective view showing a state in which a side cover and a lifting suppressing member are removed and a membrane cartridge is pulled out from the casing of the submerged membrane separator in the first embodiment.
Figure 3:
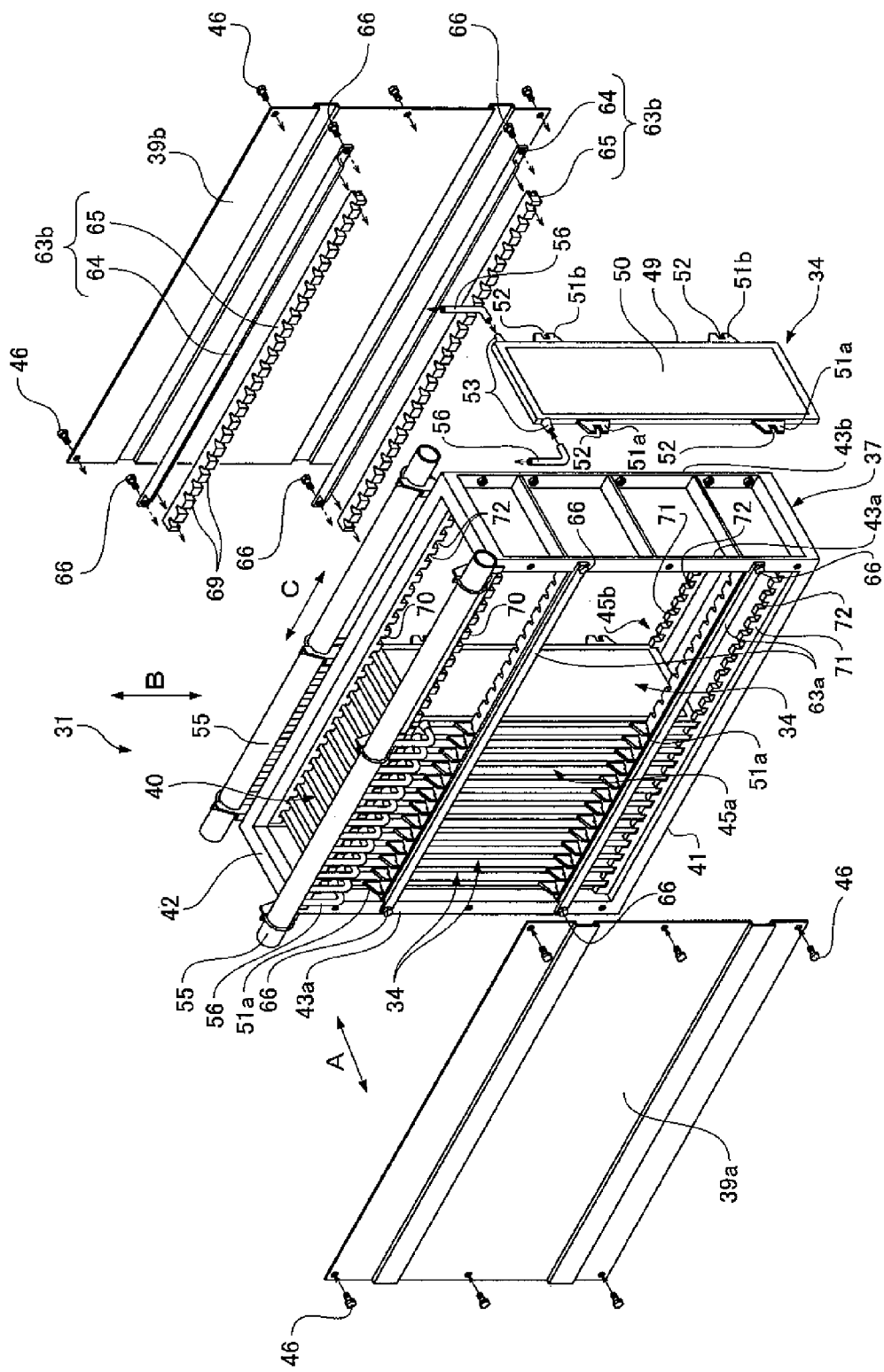
FIG. 3 is an exploded perspective view showing the configuration of the submerged membrane separator in the first embodiment.

As shown in FIGS. 2 and 3, the casing 33 for membranes includes a frame body 37, a pair of front and rear end covers 38 for covering both front and rear ends of the frame body 37, and a pair of left and right side panels 39a and 39b detachably attached to both sides of the frame body 37.

The frame body 37 includes a bottom frame 41 having a square frame shape, an upper frame 42 having a square frame shape, and a plurality of vertical frames 43a and 43b coupled between the four corners of both the frames 41 and 42.

Side openings 45a and 45b through which the membrane cartridge 34 can be removed and inserted in a width direction A (left-right direction) are formed on both left and right sides of the frame body 37. The one side panel 39a is attached to the frame body 37 by a plurality of bolts 46 and closes the one side opening 45a. Similarly, the other side panel 39b is attached to the frame body 37 by a plurality of bolts 46 and closes the other side opening 45b. When the bolts 46 are unscrewed and the one side panel 39a is removed from the frame body 37, the one side opening 45a is opened. Similarly, when the other side panel 39b is removed from the frame body 37, the other side opening 45b is opened.

Figure 4:
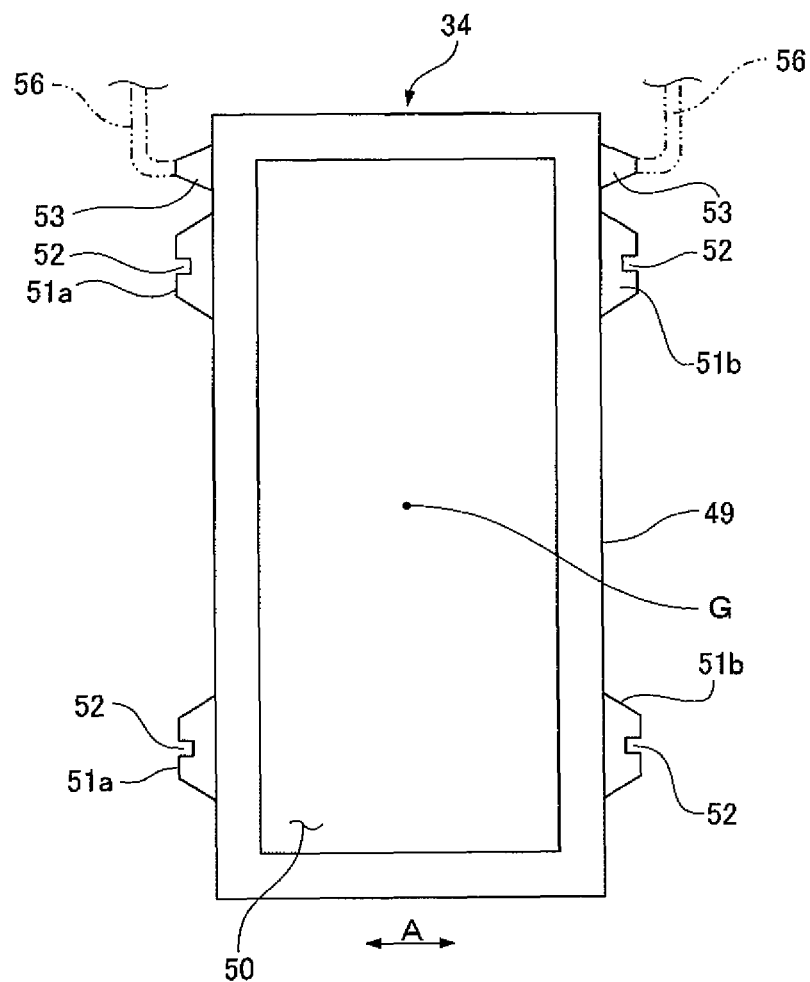
FIG. 4 is a front view of the membrane cartridge of the submerged membrane separator in the first embodiment.

As shown in FIG. 4, each of the membrane cartridges 34 includes a flat filtration plate 49 formed in a rectangular shape in the up-down direction, filtration membranes 50 attached to both front and rear sides of the filtration plate 49, and a plurality of side plates 51a and 51b (an example of side portions). The peripheral edges of the filtration membranes 50 are welded to the filtration plate 49 by ultrasound or the like, whereby the filtration membranes 50 are attached to the filtration plate 49. The upper and lower side plates 51a and 51b are provided in pairs on both sides of the filtration plate 49 in the width direction A, and project to the outer side. Recesses 52 having a square shape (an example of fitting portions) are formed in the side plates 51a and 51b.

Water intake nozzles 53 (an example of water intake portions) for sucking treated water obtained by the filtration membranes 50 are provided at upper ends on both sides orthogonal to the width direction A of the filtration plate 49. Permeate channels (not shown) that communicate with the water intake nozzles 53 are respectively formed on both front and rear sides of the filtration plate 49. The permeate channels are covered with the filtration membranes 50.

As shown in FIGS. 1 to 3, a pair of left and right water collecting pipes 55 for collecting treated water sucked from the water intake nozzles 53 of the membrane cartridges 34 are provided in the front-rear direction on the outer sides on the left and right of the upper frame 42 of the frame body 37. The water collecting pipes 55 and the water intake nozzles 53 are connected via connection pipes 56 having flexibility.

As shown in FIG. 3 and FIGS. 7 to 9, upper guiding members 70 and lower guiding members 71 for guiding the membrane cartridges 34 in the width direction A (left-right direction) are provided in the inside of the casing 33 for membranes. The left and right upper guiding members 70 are provided in pairs in the upper frame 42 of the frame body 37. The left and right lower guiding members 71 are provided in pairs in the bottom frame 41.

A plurality of front and rear guiding grooves 72 are formed in each of the upper and lower guiding members 70 and 71. The upper ends of the membrane cartridges 34 are freely inserted into and removed from the guiding grooves 72 of the upper guiding member 70 from the width direction A (left-right direction). The lower ends of the membrane cartridges 34 are freely inserted into and removed from the guiding grooves 72 of the lower guiding member 71 from the width direction A (left-right direction).

Figure 7:
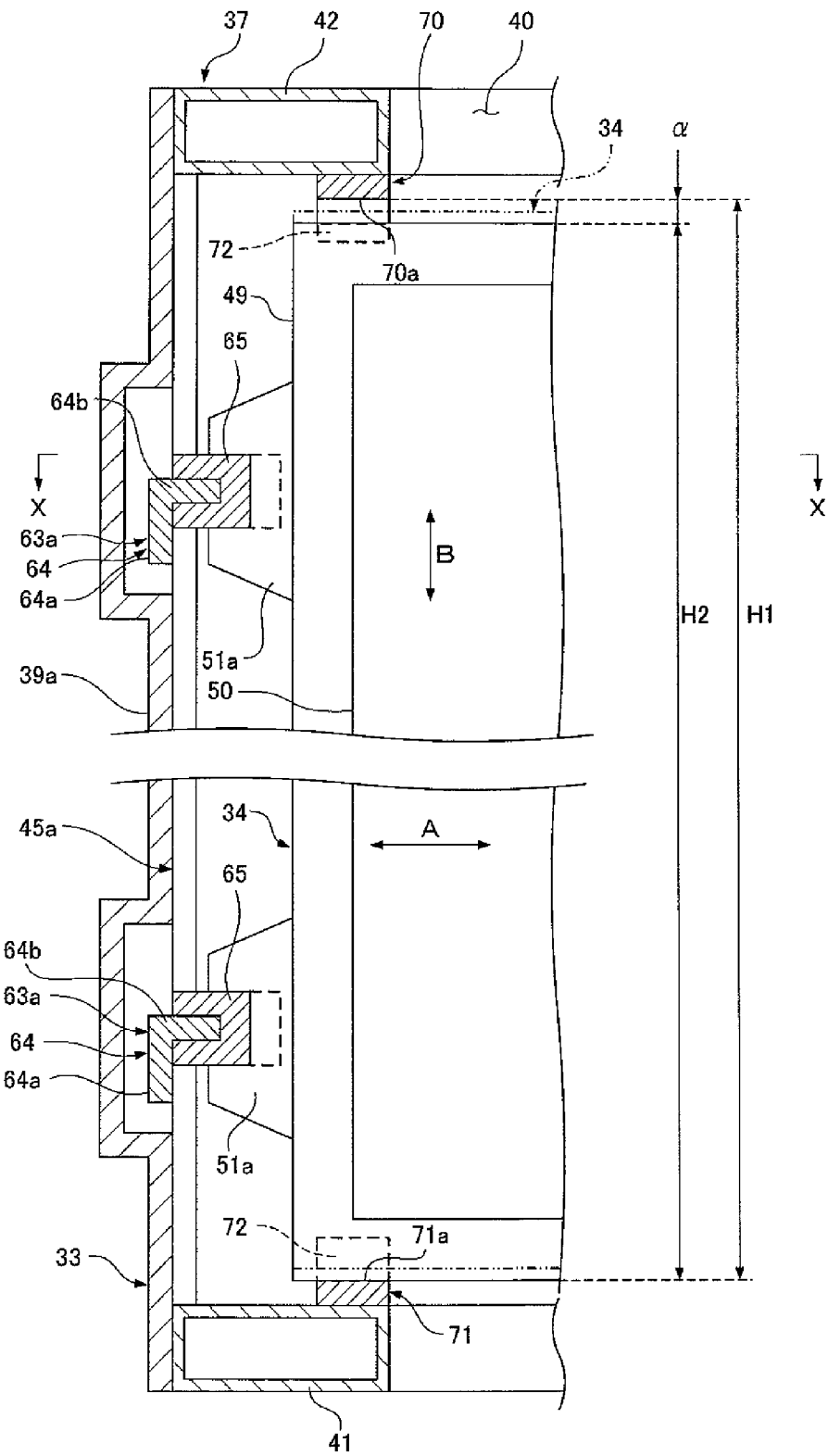
FIG. 7 is a longitudinal sectional view of left ox right one side of the casing and left or right one side of the membrane cartridge of the submerged membrane separator in the first embodiment.

As shown in FIG. 7, a height H1 between an upper inner surface 70a of the guiding groove 72 of the upper guiding member 70 and a lower inner surface 71a of the guiding groove 72 of the lower guiding member 71 is set larger than a height H2 of the membrane cartridge 34. Consequently, the membrane cartridge 34 has a space α (i.e., α=H1−H2) in the up-down direction and is held in the inside of the casing 33 so as to move in an up-down direction B.

As shown in FIG. 9, a width D of each of the guiding grooves 72 is set larger than a thickness T of the membrane cartridge 34. Consequently, the membrane cartridge 34 has a space β (i.e., β=D−T) in an array direction C (front-rear direction) and is held in the inside of the casing 33 so as to move in the array direction C.

Figure 5A:
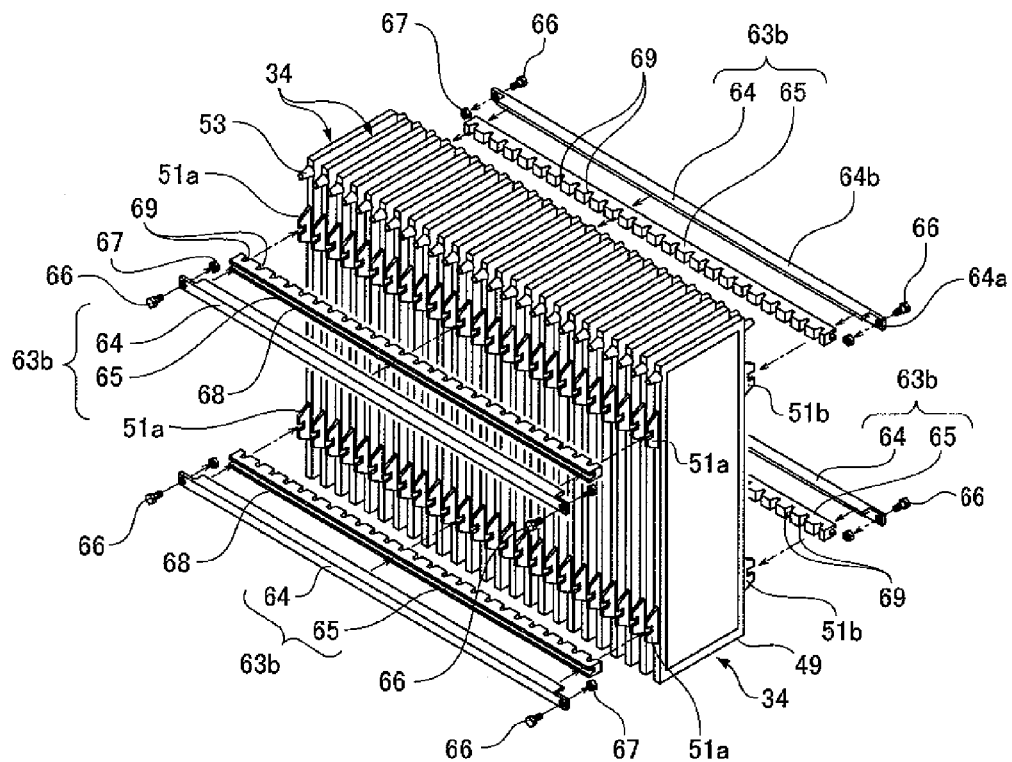
FIG. 5A is an exploded perspective view of the lifting suppressing member of the submerged membrane separator in the first embodiment.

As shown in FIGS. 2 and 3, left and right lifting suppressing members 63a and 63b are provided in pairs in upper and lower places in the casing 33 for membranes. As shown in FIGS. 5 and 6, these lifting suppressing members 63a and 63b restrict a lifting amount of the membrane cartridges 34 during a filtration operation to be smaller than the space α in the up-down direction (i.e., 0<lifting amount<space α). The lifting suppressing members 63a and 63b include horizontal frames 64 and suppressing bodies 65 provided in the horizontal frames 64.

As shown in FIGS. 5 to 9, the horizontal frames 64 are angle-shaped members having vertical plate portions 64a and horizontal plate portions 64b. Both ends of the horizontal frame 64 are detachably coupled between the front and rear vertical frames 43a and 43b by bolts 66 and nuts 67.

The suppressing bodies 65 are portions that come into contact with the side plates 51a and 51b of the membrane cartridges 34. The material of the suppressing bodies 65 is an elastic body such as rubber. Grooves 68 are formed over the entire length on the outer surfaces of the suppressing bodies 65. A plurality of front and rear V-shaped slits 69 are formed on the inner surfaces of the suppressing bodies 65. The horizontal plate portions 64b of the horizontal frames 64 are inserted into the grooves 68 of the suppressing bodies 65, whereby the suppressing bodies 65 are attached to the horizontal frames 64.

Figure 9A:
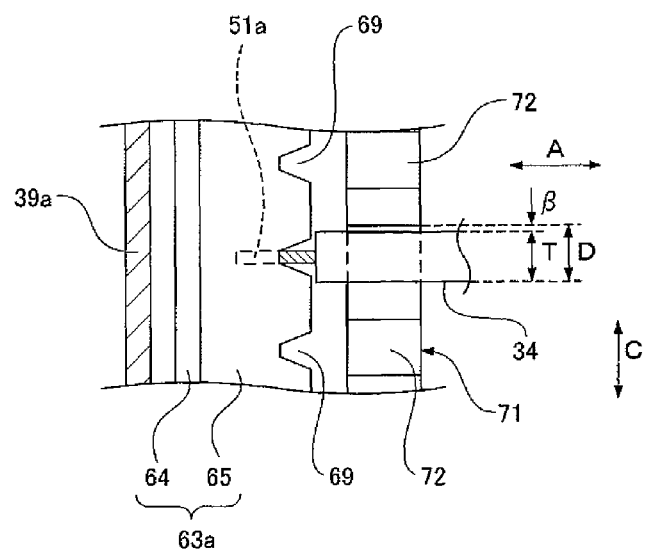
FIG. 9A is a view taken along arrows X-X in FIG. 7.

As shown in FIGS. 6, 7, and 9A, the slits 69 of the suppressing bodies 65 fit in the recesses 52 of the side plates 51a and 51b of the membrane cartridges 34. In this state, the membrane cartridges 34 are supported by the lifting suppressing members 63a and 63b, and a space S in the array direction C between the membrane cartridges 34 is maintained at a predetermined space. The recesses 52 and the slits 69 are fit without backlashing in the width direction A (left-right direction), the up-down direction B, and the array direction C (front-rear direction).

Actions in the configuration are explained below.

(1) During a filtration operation, as shown in FIG. 1, the inner sides of the membrane cartridges 34 are depressurized while air is diffused from the air diffuser 36, whereby sludge or the like in a liquid to be treated 47 is caught by the filtration membranes 50 of the membrane cartridges 34. Permeate permeating through the filtration membranes 50 and flowing into the inner sides of the membrane cartridges 34 is collected as treated water 48 in the water collecting pipe 55 from the water intake nozzles 53 through the connection pipes 56.

Figure 6A:
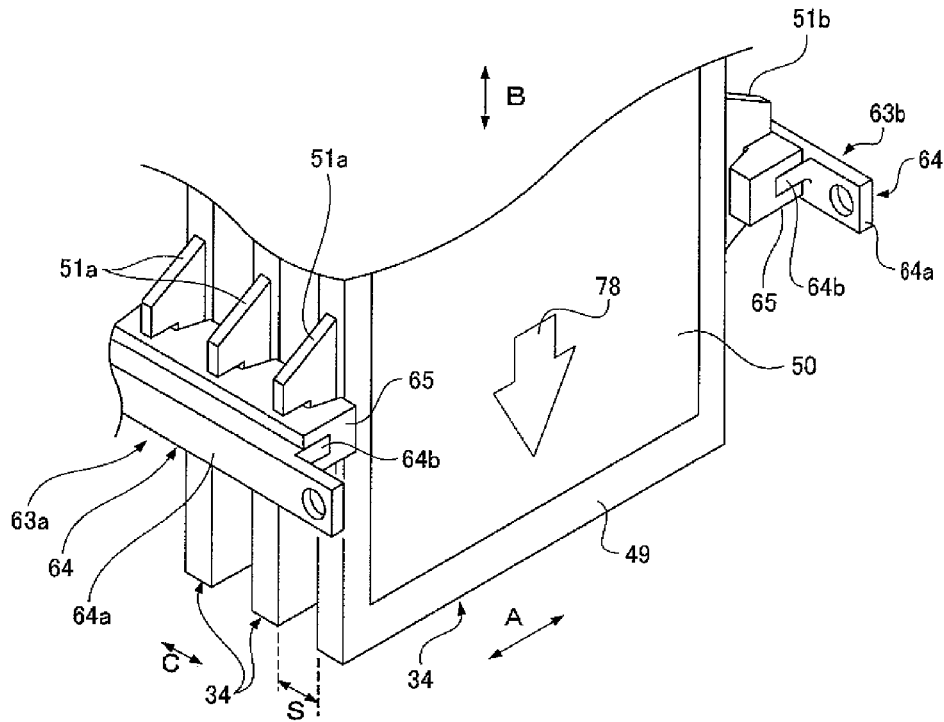
FIG. 6A is an enlarged perspective view of the mating portion of slits of the lifting suppressing member and the recesses of side plates of the membrane cartridges of the submerged membrane separator in the first embodiment, and shows a state in which air diffusion is stopped.
Figure 6B:
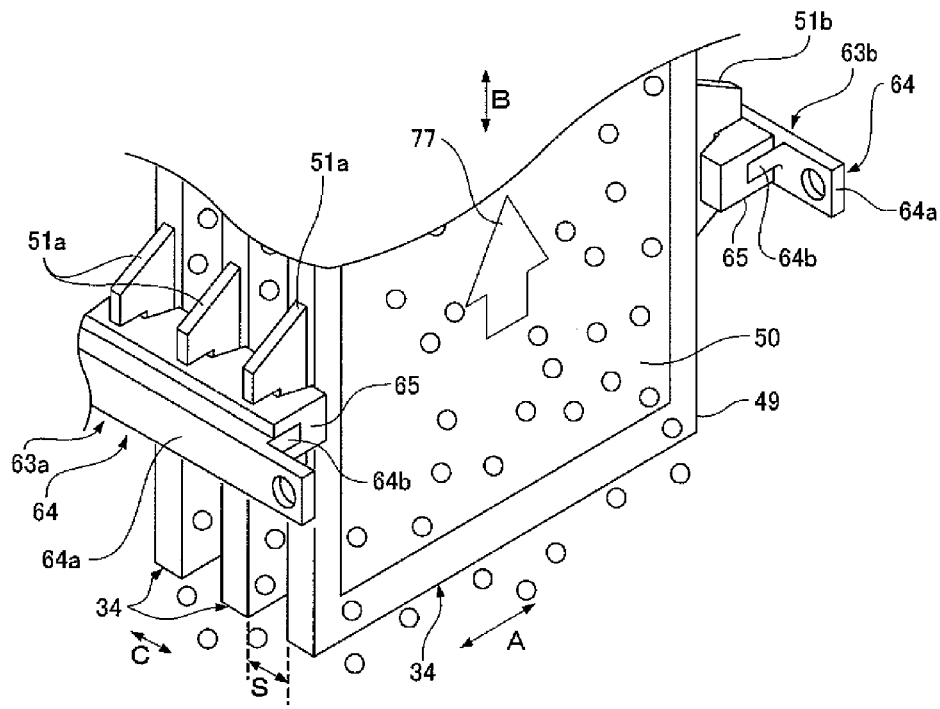
FIG. 6B is an enlarged perspective view of the mating portion of slits of the lifting suppressing member and the recesses of side plates of the membrane cartridges of the submerged membrane separator in the first embodiment, and shows a state in which air diffusion is performed.

In this case, as shown in FIG. 6B, the upflow 77 is generated among the membrane cartridges 34 by bubbles of the air diffused from the air diffuser 36. Matters adhering to the membrane surface deposits of the membrane cartridges 34 (sludge, etc.) are removed by the upflow 77.

As shown in FIG. 3, since the water intake nozzles 53 are provided at the upper ends on both sides of the filtration plate 49, the upflow 77 smoothly flows without hitting the connection pipes 56. Therefore, matters adhering to the membrane surfaces of the membrane cartridges 34 are sufficiently removed. Since the upflow 77 does not hit the connection pipes 56, vibration of the connection pipes 56 is reduced and it is possible to prevent a crack from occurring around the water intake nozzles 53. During the filtration operation, an upward force acts on the membrane cartridges 34 due to the upflow 77 and buoyancy. The suppressing bodies 65 (a portion of the elastic body) of the lifting suppressing members 63a and 63b are elastically deformed by this upward force. As indicated by a virtual line in FIG. 7, the membrane cartridge 34 lifts upward from the lower inner surface 71a of the guiding groove 72 of the lower guiding member 71.

In this case, the lifting amount of the membrane cartridges 34 is restricted by the lifting suppressing members 63a and 63b to be smaller than the space α in the up-down direction B. For example, if the space α is 6 mm, the lifting amount of the membrane cartridges 34 is restricted to 3 mm. The space α and the lifting amount of the membrane cartridges 34 are not limited to the numerical values.

Consequently, the membrane cartridges 34 vibrate actively and minutely while being kept in a state in which the membrane cartridges 34 are lifted within the range of the space α in the up-down direction B. Therefore, a cleaning effect for the membrane surfaces of the membrane cartridges 34 is improved. Further, a contact portion between the membrane cartridges 34 and the upper guiding members 70 fixed to the casing 33 is reduced and a contact portion between the membrane cartridges 34 and the lower guiding members 71 fixed to the casing 33 is reduced. Therefore, the abrasion of the membrane cartridges 34 is reduced.

The minute vibration of the membrane cartridges 34 occurs in the width direction A (left-right direction), the up-down direction B, and the array direction C (front-rear direction).

(2) When the membrane cartridge 34 is removed in maintenance or the like, the air diffusion by the air diffuser 36 is stopped, the filtration operation is stopped, and the liquid to be treated 47 in the treatment tank 32 is discharged. In this case, the upward force does not act on the membrane cartridge 34, the suppressing bodies 65 of the lifting suppressing members 63a and 63b are subjected to own weight 78 of the membrane cartridge 34 and are elastically deformed, and the membrane cartridge 34 sinks with the own weight 78. As indicated by a solid line in FIG. 7, the lower end of the membrane cartridge 34 comes into contact with and is supported by the lower inner surface 71a of the guiding groove 72 of the lower guiding member 71. The space α in the up-down direction B is formed between the upper end of the membrane cartridge 34 and the upper inner surface 70a of the guiding groove 72 of the upper guiding member 70.

Figure 8:
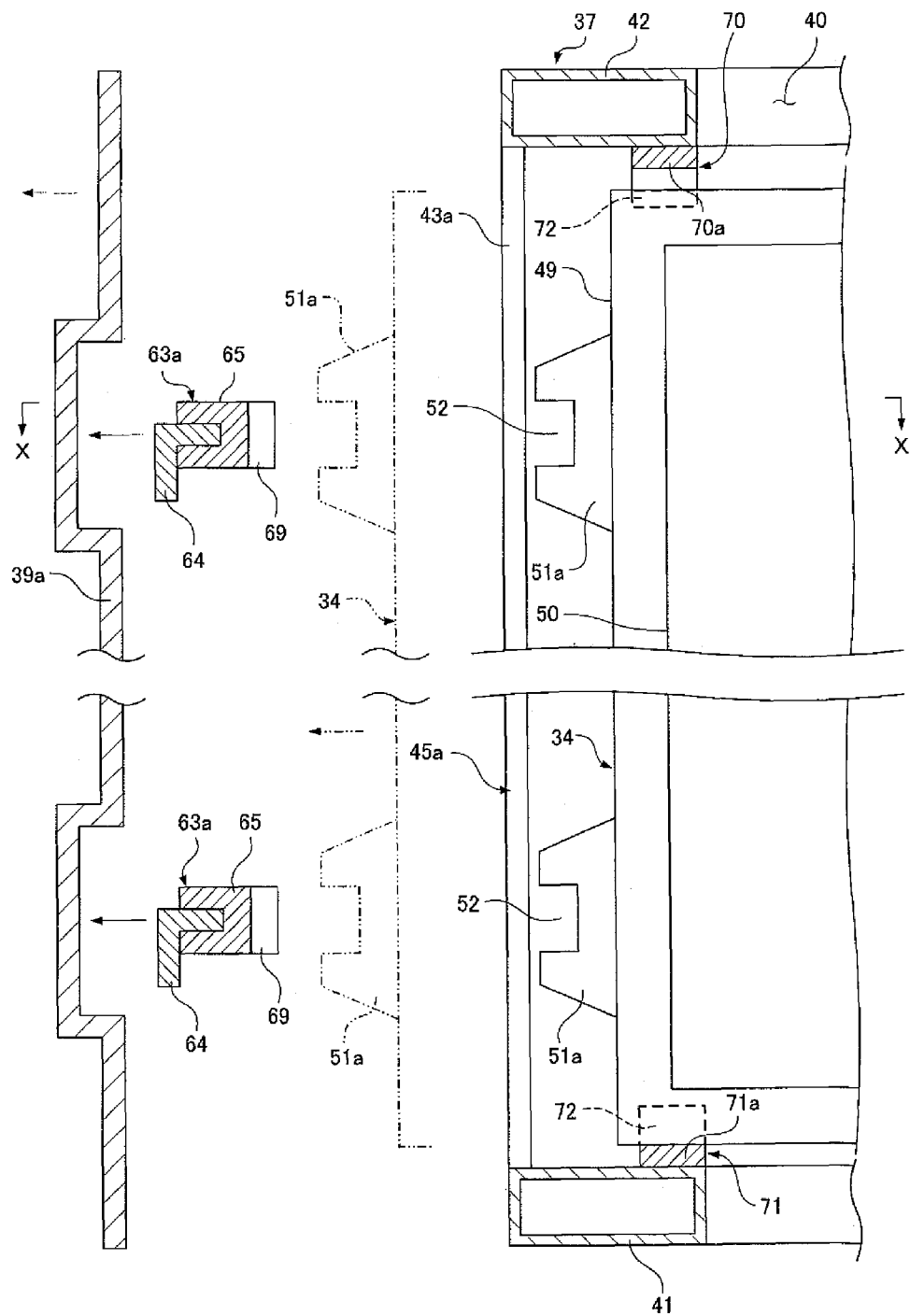
FIG. 8 is a longitudinal sectional view of left or right one side of the casing and left or right one side of the membrane cartridge of the submerged membrane separator in the first embodiment, and shows a state in which the side cover and the lifting suppressing member are removed from the casing.

Thereafter, as shown in FIGS. 2 and 8, the bolts 46 are unscrewed to remove the one side panel 39a from the frame body 37 and open the one side opening 45a.

Figure 9B:
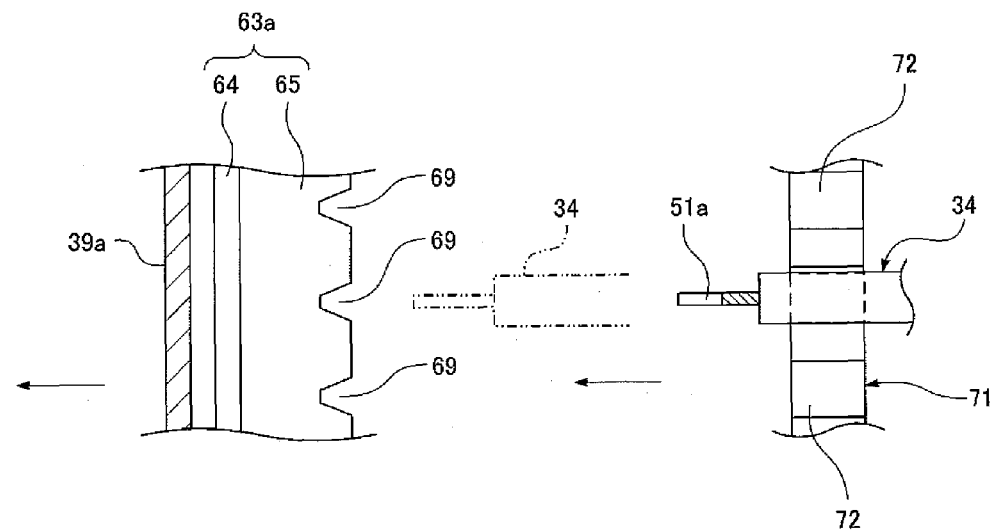
FIG. 9B is a view taken along arrows X-X in FIG. 8.

Subsequently, the bolts 66 are unscrewed to remove the left or right one lifting suppressing member 63a from the frame body 37. Consequently, as shown in FIGS. 8 and 9B, the left or right one side plate 51a of the membrane cartridge 34 disengages from the slit 69 of the left or right one space suppressing member 63a. Thereafter, as indicated by virtual lines in FIGS. 2 and 8, the membrane cartridge 34 can be pulled out from the inside of the casing 33 in the width direction A of the membrane cartridge 34 through the one side opening 45a, and taken out to the outer side of the casing 33. At this point, the recesses 52 of the left or right other side plate 51b of the membrane cartridge 34 disengage from the slits 69 of the left or right other lifting suppressing member 63b. The membrane cartridge 34 is pulled out in the width direction A while being guided by the upper and lower guiding grooves 72.

Consequently, it is possible to easily pull out the membrane cartridge 34 from the inside of the casing 33 in the left-right lateral direction. As shown in FIG. 1, it is possible to keep the height of a space 73 above the casing 33 low. Further, even if sludge clogs spaces between the sides of the membrane cartridges 34 opposed to each other, it is possible to easily pull out the membrane cartridges 34 from the inside of the casing 33.

(3) When the membrane cartridge 34 is attached, as shown in FIGS. 2 and 8, the membrane cartridge 34 is inserted from the outer side of the casing 33 in the width direction A of the membrane cartridge 34 through one side opening 45a. At this point, the membrane cartridge 34 is inserted in the width direction A while being guided by the upper and lower guiding grooves 72. The recesses 52 of the left or right other side plate 51b of the membrane cartridge 34 fit in the slits 69 of the left or right other lifting suppressing member 63b.

Figure 5B:
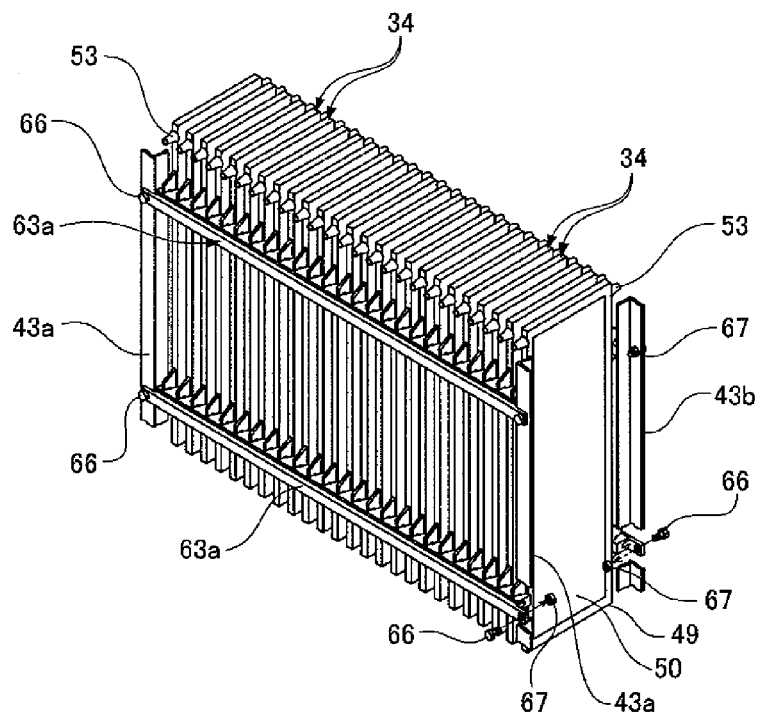
FIG. 5B is a perspective view of the membrane cartridges restricted from being lifted by the lifting suppressing member of the submerged membrane separator in the first embodiment.

Subsequently, as shown in FIG. 5B, the bolts 66 are screwed to attach the left or right one lifting suppressing member 63a to the vertical frame 43a on one of the left and right of the frame body 37. Consequently, as shown in FIGS. 7 and 9A, the recess 52 of the left or right one side plate 51a of the membrane cartridge 34 fits into the slit 69 of the left or right one lifting suppressing member 63a.

Thereafter, the bolts 46 are screwed to attach the one side panel 39a to the frame body 37 to close the one side opening 45a. Consequently, the membrane cartridge 34 is housed and held in the inside of the casing 33.

Since the one side opening 45a of the casing 33 for membranes is closed by the one side panel 39a and the other side opening 45b is closed by the other side panel 39b, during the filtration operation, it is possible to prevent bubbles of the air diffused from the air diffuser 36 from being released to the outside of the casing 33 through the side openings 45a and 45b.

In the first embodiment, as shown in FIG. 2, the one side panel 39a and one lifting suppressing member 63a are removed from the frame body 37 to open the one side opening 45a and remove the membrane cartridge 34 from and insert the membrane cartridge 34 into the casing 33 through the one side opening 45a. However, as shown in FIG. 3, the other side panel 39b and the other lifting suppressing member 63b may be removed from the frame body 37 to remove the membrane cartridge 34 from and insert the membrane cartridge 34 into the casing 33 through the other side opening 45b.

In the first embodiment, as shown in FIG. 3, the left and right water intake nozzles 53 are provided in pairs in the membrane cartridge 34 and the left and right water collecting pipes 55 are provided in pairs in the frame body 37. However, only one of the left and right water intake nozzles 53 may be provided and only one of the left and right water collecting pipes 55 may be provided.

Figure 10:
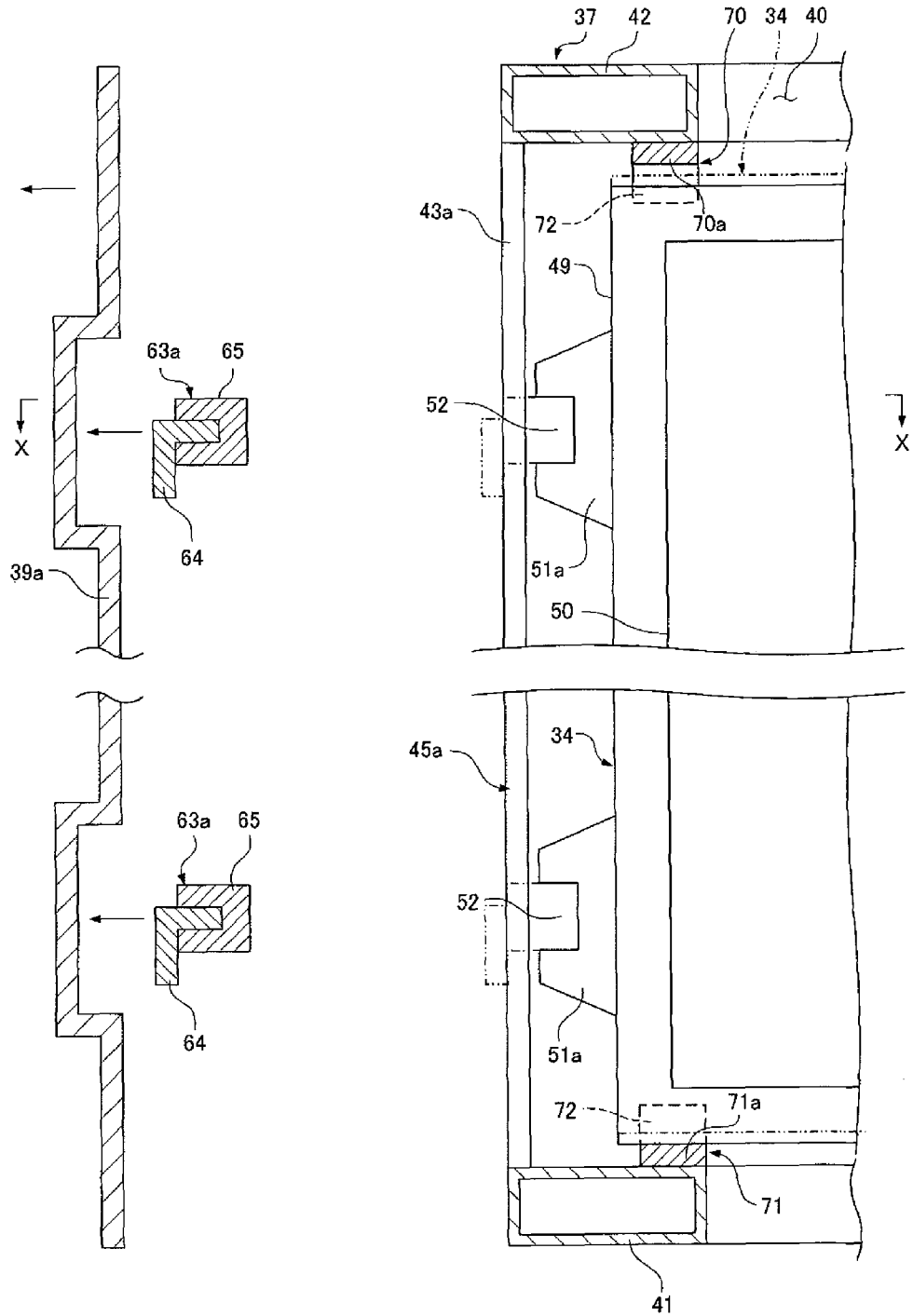
FIG. 10 is a longitudinal sectional view of left or right one side of the casing and left or right one side of the membrane cartridge of a submerged membrane separator in a second embodiment of the present invention, and shows a state in which a side cover and a lifting suppressing member are removed from the casing.

In the first embodiment, the suppressing bodies 65 of the lifting suppressing members 63a and 63b have the slits 69. However, in a second embodiment of the present invention, as shown in FIG. 10, suppressing bodies 65 do not have slits 69. The suppressing bodies 65 fit in recesses 52 of side plates 51a and 51b of membrane cartridges 34.

In the first embodiment and the second embodiment, the left and right side plates 51a and 51b are provided in pairs in the upper and lower places of the membrane cartridge 34. However, the side plates 51a and 51b may be provided in a plurality of places or only one place other than the upper and lower places. In the first embodiment and the second embodiment, the left and right lifting suppressing members 63a and 63b are provided in pairs in the upper and lower places in the inside of the casing 33. However, the lifting suppressing members 63a and 63b may be provided in a plurality of places or only one place other than the upper and lower places.

Figure 11:
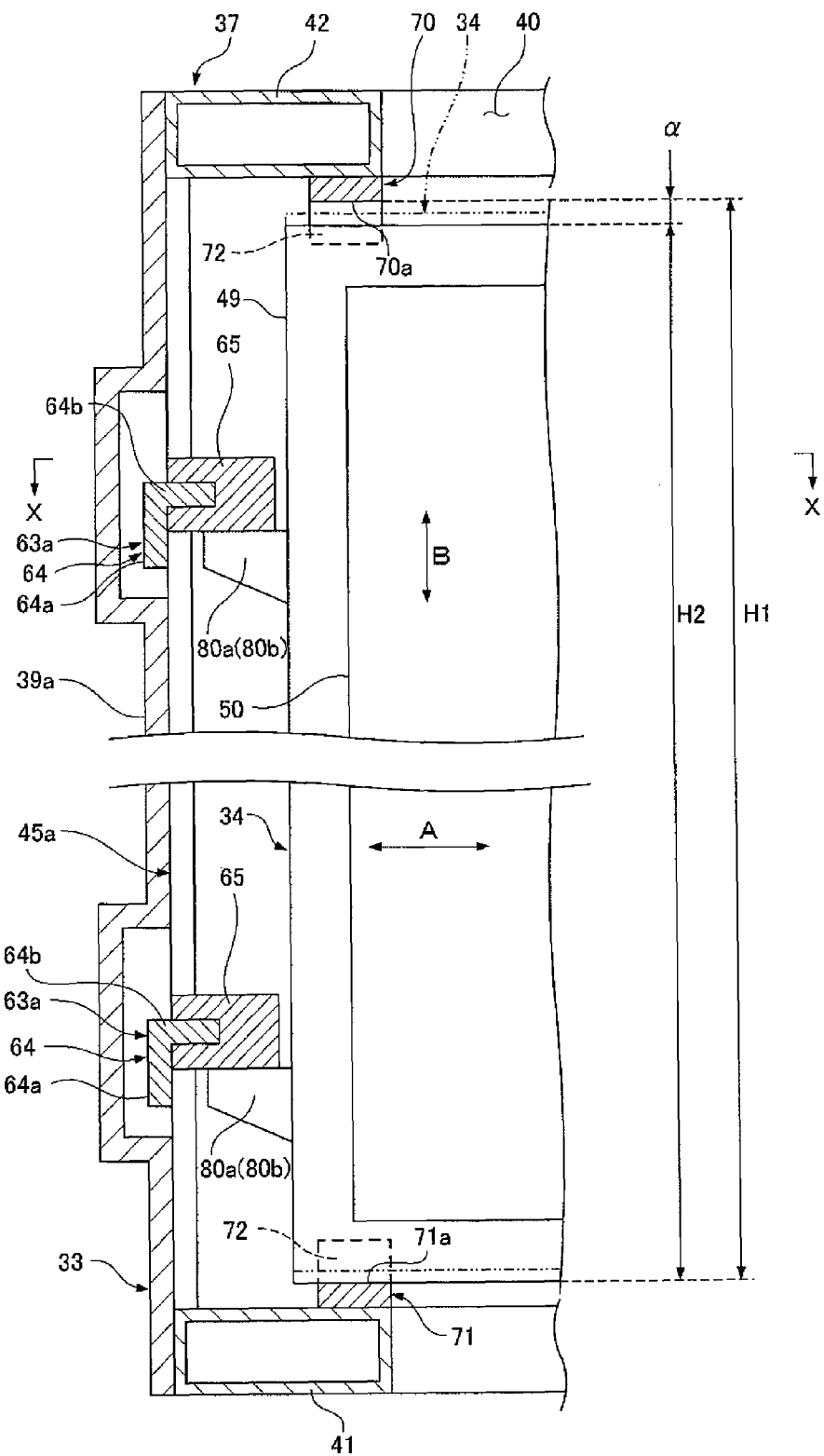
FIG. 11 is a longitudinal sectional view of left or right one side of the casing and left or right one side of the membrane cartridge of a submerged membrane separator in a third embodiment of the present invention.

Next, a third embodiment in the present invention is explained with reference to FIG. 11.

A membrane cartridge 34 has a plurality of engaging plates 80a and 80b (an example of engaging portions). The upper and lower engaging plates 80a and 80b are provided in pairs on both sides in the width direction A of a filtration plate 49 and project to the outer side.

One of the left and right engaging plates 80a engages with a suppressing body 65 of one of left and right lifting suppressing members 63a from below. Similarly, the other one of the left and right engaging plates 80b engages with the suppressing body 65 of the other one of left and right lifting suppressing members 63b from below.

Consequently, during a filtration operation, an upward force acts on the membrane cartridge 34 with upflow 77 and buoyancy, and the engaging plates 80a and 80b press upward the suppressing bodies 65 (a portion of an elastic body) of the lifting suppressing members 63a and 63b, whereby the suppressing bodies 65 of the lifting suppressing members 63a and 63b are elastically deformed. As indicated by a virtual line in FIG. 11, the membrane cartridge 34 is lifted upward from a lower inner surface 71a of a guiding groove 72 of a lower guiding member 71.

In this case, the lifting amount of the membrane cartridge 34 is restricted by the lifting suppressing members 63a and 63b to be smaller than a space α in an up-down direction B. Consequently, the membrane cartridge 34 vibrates actively and minutely while being kept in a state in which the membrane cartridge 34 is lifted within the range of the space α in the up-down direction B. Therefore, a cleaning effect for the membrane surface of the membrane cartridge 34 is improved. Further, a contact portion between the membrane cartridge 34 and an upper guiding member 70 fixed to a casing 33 is reduced and a contact portion between the membrane cartridge 34 and the lower guiding member 71 fixed to the casing 33 is reduced. Therefore, the abrasion of the membrane cartridge 34 is reduced.

When air diffusion by an air diffuser 36 is stopped, the filtration operation is stopped, and a liquid to be treated 47 in a treatment tank 32 is discharged, an upward force does not act on the membrane cartridge 34 and the membrane cartridge 34 sinks with own weight 78. As indicated by a solid line in FIG. 11, the lower end of the membrane cartridge 34 comes into contact with and are supported by the lower inner surface 71a of the guiding groove 72 of the lower guiding member 71. The space α in the up-down direction B is formed between the upper end of the membrane cartridge 34 and an upper inner surface 70a of the guiding groove 72 of the upper guiding member 70.

In the third embodiment, the left and right engaging plates 80a and 80b are provided in pairs in the upper and lower places of the membrane cartridge 34. However, the engaging plates 80a and 80b may be provided in a plurality of places or only one place other than the upper and lower places. In the third embodiment, the left and right lifting suppressing members 63a and 63b are provided in pairs in the upper and lower places in the inside of the casing 33. However, the lifting suppressing members 63a and 63b may be provided in a plurality of places or only one place other than the upper and lower places.

In the first to third embodiments, the lifting suppressing members 63a and 63b are provided in a frame body 37. However, one of the left and right lifting suppressing members 63a may be provided on the inner surface of one side panel 39a and the other one of the left and right lifting suppressing members 63b may be provided on the inner surface of the other side panel 39b.

In the first to third embodiments, even in a state in which the filtration operation is stopped, the membrane cartridges 34 are set in contact with the lifting suppressing members 63a and 63b. However, when the filtration operation is stopped, the membrane cartridges 34 may be separated from the lifting suppressing members 63a and 63b without being in contact with the lifting suppressing members 63a and 63b, and when the filtration operation is carried out, the membrane cartridges 34 may be set in contact with the lifting suppressing members 63a and 63b.

Figure 12A:
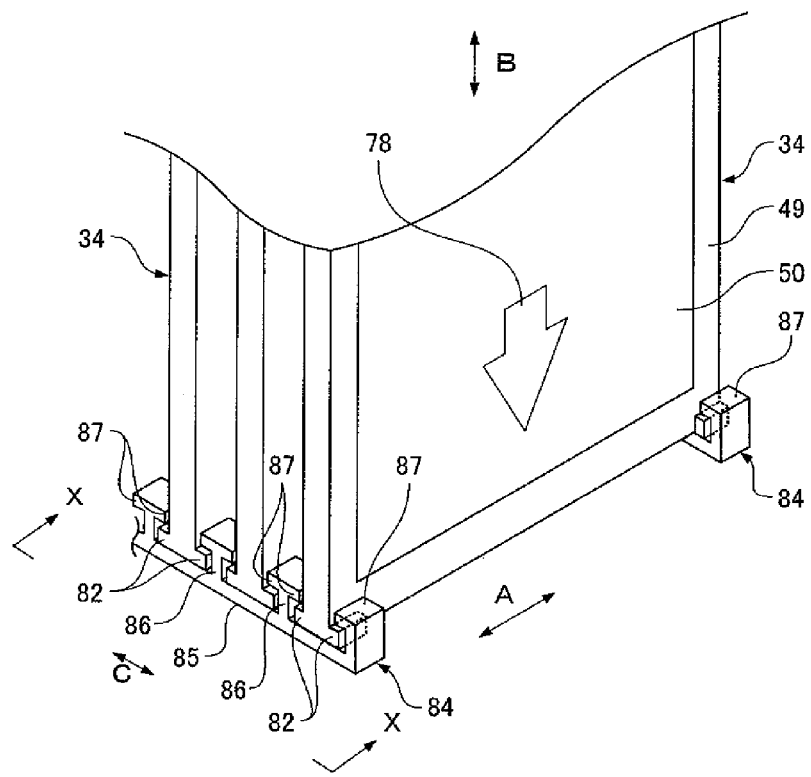
FIG. 12A is a perspective view of the lower part of the membrane cartridges and the lifting suppressing member of a submerged membrane separator in a fourth embodiment of the present invention, and shows a state in which air diffusion is stopped.

Next, a fourth embodiment in the present invention is explained with reference to FIGS. 12 and 13.

A membrane cartridge 34 has a plurality of lower engaging projecting portions 82 (an example of engaging portions). These lower engaging projecting portions 82 are provided on both sides of the lower side of a filtration plate 49 and project in an array direction C.

In a bottom frame 41 of a frame body 37, a pair of left and right lifting suppressing members 84 for restricting a lifting amount with respect to the lower side of the membrane cartridge 34 are provided. Each of the lifting suppressing members 84 includes a bottom plate portion 85, a plurality of vertical plate portions 86 erected upward from the bottom plate portion 85, and projecting portions 87 to be engaged projecting in the array direction C from the upper ends of the vertical plate portions 86.

The lower engaging projecting portion 82 is removably insertable into a width direction A between the vertical plate portions 86 opposed to each other in the array direction C. The filtration plate 49 is removably insertable into the width direction A between the projecting portions 87 to be engaged opposed to each other in the array direction C. The lower engaging projecting portion 82 engages with the projecting portion 87 to be engaged from below. As in the first embodiment, the upper ends of the membrane cartridges 34 are inserted into grooves 72 of upper guiding members 70. Further, as in the first embodiment, the membrane cartridges 34 are held in the inside of a casing 33 in a state in which the membrane cartridges 34 have a space α in an up-down direction B.

A vertical space from the bottom plate portion 85 to the projecting portions 87 to be engaged is larger than the vertical thickness of the lower engaging projecting portions 82. A space γ is formed between the projecting portions 87 to be engaged and the lower engaging projecting portions 82. This space γ is set smaller than the space α.

Actions in the configuration are explained below.

Figure 12B:
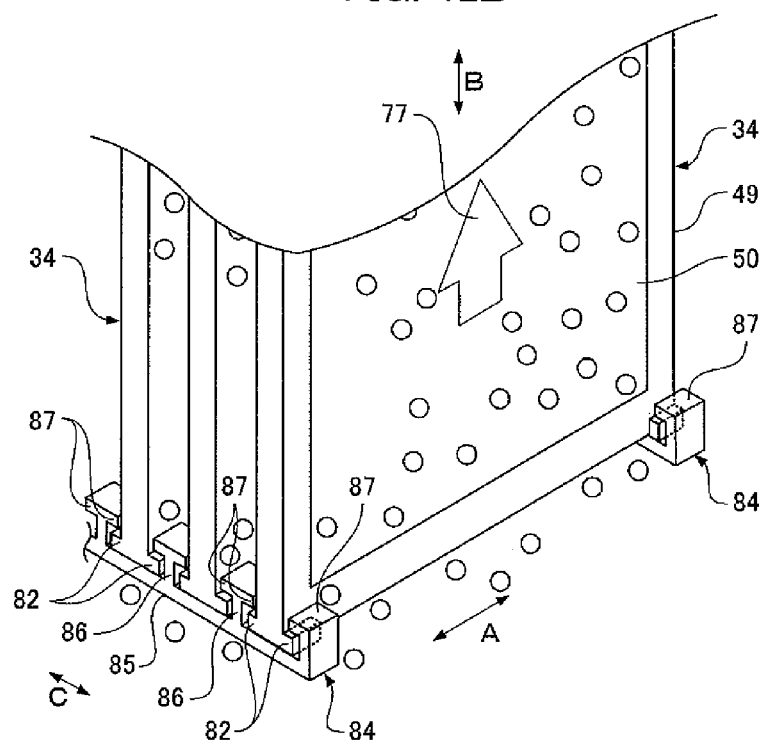
FIG. 12B is a perspective view of the lower part of the membrane cartridges and the lifting suppressing member of the submerged membrane separator in the fourth embodiment, and shows a state in which air diffusion is performed.
Figure 13:
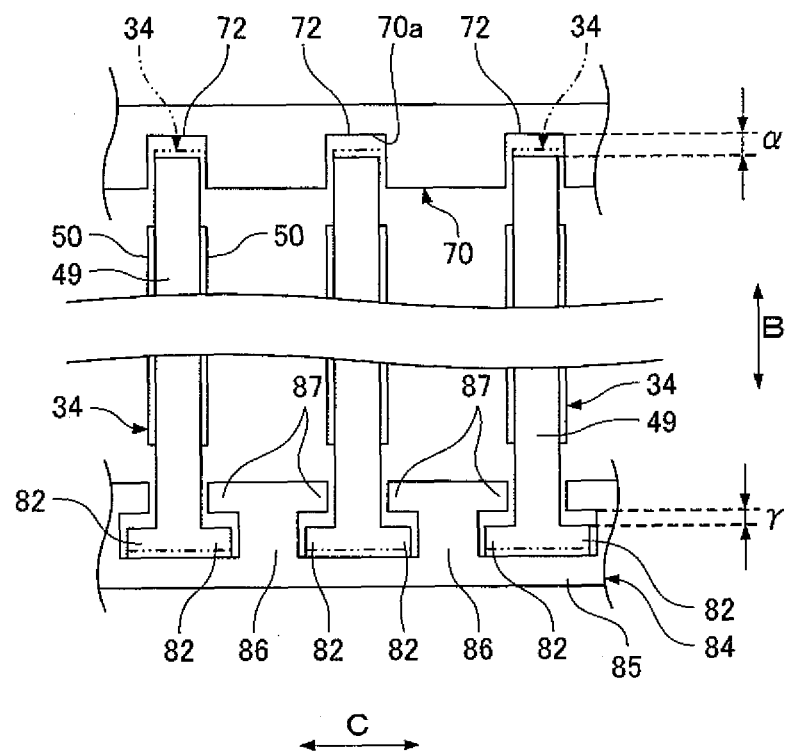
FIG. 13 is a view taken along arrows X-X in FIG. 12A.

During a filtration operation, as shown in FIG. 12B, an upward force acts on the membrane cartridges 34 due to upflow 77 and buoyancy. As indicated by a virtual line in FIG. 13, the membrane cartridges 34 are lifted upward and the lower engaging projecting portions 82 engage with the projecting portions 87 to be engaged of the lifting suppressing member 84.

In this case, the lifting amount of the membrane cartridges 34 is restricted by the lifting suppressing member 84 to an amount equivalent to the space γ smaller than the space α in the up-down direction B. Consequently, the membrane cartridges 34 vibrate actively and minutely while being kept in a state in which the membrane cartridges 34 are lifted within the range of the space α. Therefore, a cleaning effect for the membrane surfaces of the membrane cartridges 34 is improved. A contact portion between the membrane cartridges 34 and the upper guiding member 70 fixed to a casing 33 is reduced and the abrasion of the membrane cartridges 34 is reduced.

When air diffusion by an air diffuser 36 is stopped, the filtration operation is stopped, and a liquid to be treated 47 in a treatment tank 32 is discharged, an upward force does not act on the membrane cartridges 34. As indicated by a solid line in FIG. 13, the membrane cartridges 34 sink with own weight 78, the lower ends of the membrane cartridges 34 are supported by the bottom plate portion 85 of the lifting suppressing member 84, and the space α in the up-down direction B is formed between the upper ends of the membrane cartridges 34 and upper inner surfaces 70a of the guiding grooves 72 of the upper guiding member 70.

Figure 14:
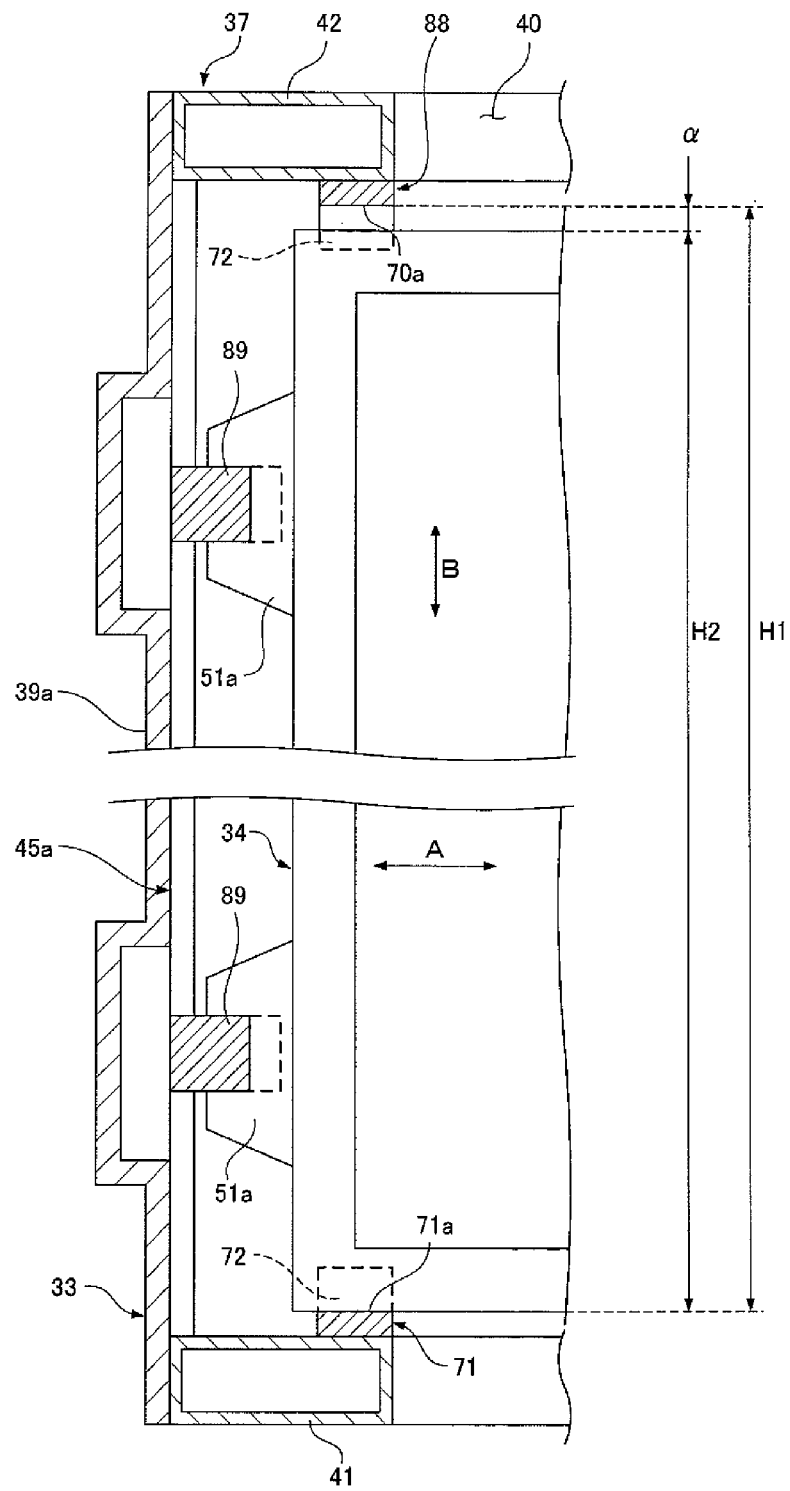
FIG. 14 is a longitudinal sectional view of left or right one side of the casing and left or right one side of the membrane cartridge of a submerged membrane separator in a fifth embodiment of the present invention.
Figure 15A:
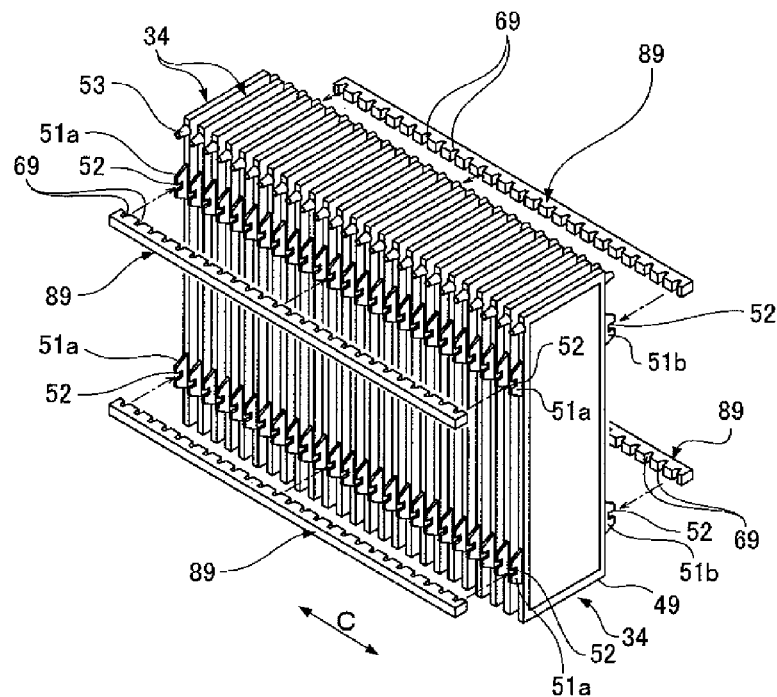
FIG. 15A is a perspective view of a state in which the space maintaining member of the submerged membrane separator is removed from the membrane cartridges in the fifth embodiment.
Figure 15B:
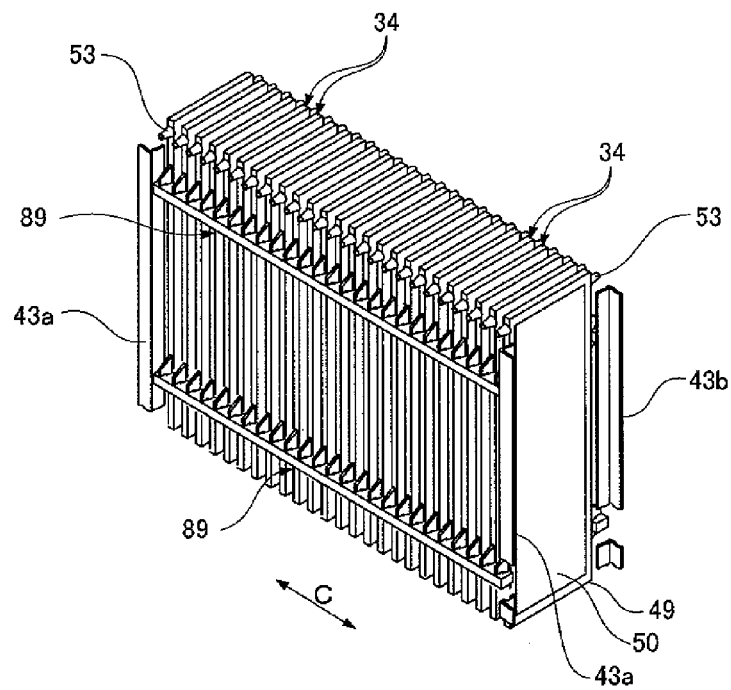
FIG. 15B is a perspective view of a state in which the space maintaining member of the submerged membrane separator is attached to the membrane cartridges in the fifth embodiment.

Next, a fifth embodiment in the present invention is explained with reference to FIGS. 14 and 15.

Lifting suppressing members 88 restrict a lifting amount with respect to the upper side of a membrane cartridge 34. Like the upper guiding member 70 in the first embodiment, the lifting suppressing members 88 have a comb-tooth structure including a plurality of guide grooves 72. The left and right lifting suppressing members 88 are provided in pairs in an upper frame 42.

A space S among the membrane cartridges 34 is kept at a predetermined space by space maintaining members 89. Like the suppressing bodies 65 in the first embodiment, the space maintaining members 89 have a plurality of front and rear V-shaped slits 69.

The slits 69 of the space maintaining members 89 fit in recesses 52 of side plates 51a and 51b of the membrane cartridges 34. Consequently, the space S in the array direction C among the membrane cartridges 34 is maintained at the predetermined space.

During a filtration operation, an upward force acts on the membrane cartridges 34 with upflow 77 and buoyancy. The membrane cartridges 34 are lifted upward. The upper ends of the membrane cartridges 34 come into contact with upper inner surfaces 70a of the guiding grooves 72 of the lifting suppressing member 88. A space is formed between the lower ends of the membrane cartridges 34 and lower inner surfaces 71a of the guiding grooves 72 of a lower guiding member 71.

In this case, the lifting amount of the membrane cartridges 34 is restricted to an amount equivalent to a space α in an up-down direction B. Consequently, the membrane cartridges 34 vibrate actively and minutely while being kept in a state in which the membrane cartridges 34 are lifted. Therefore, a cleaning effect for the membrane surfaces of the membrane cartridges 34 is improved.

When air diffusion by an air diffuser 36 is stopped, the filtration operation is stopped, and a liquid to be treated in a treatment tank 32 is discharged, an upward force does not act on the membrane cartridges 34. As shown in FIG. 14, the membrane cartridges 34 sink with own weight 78, the lower ends of the membrane cartridges 34 come into contact with and are supported by the lower inner surfaces 71a of the guiding grooves 72 of the lower guiding member 71, and the space α in the up-down direction B is formed between the upper ends of the membrane cartridges 34 and the upper inner surfaces 70a of the guiding grooves 72 of the lifting suppressing member 88.

Figure 16:
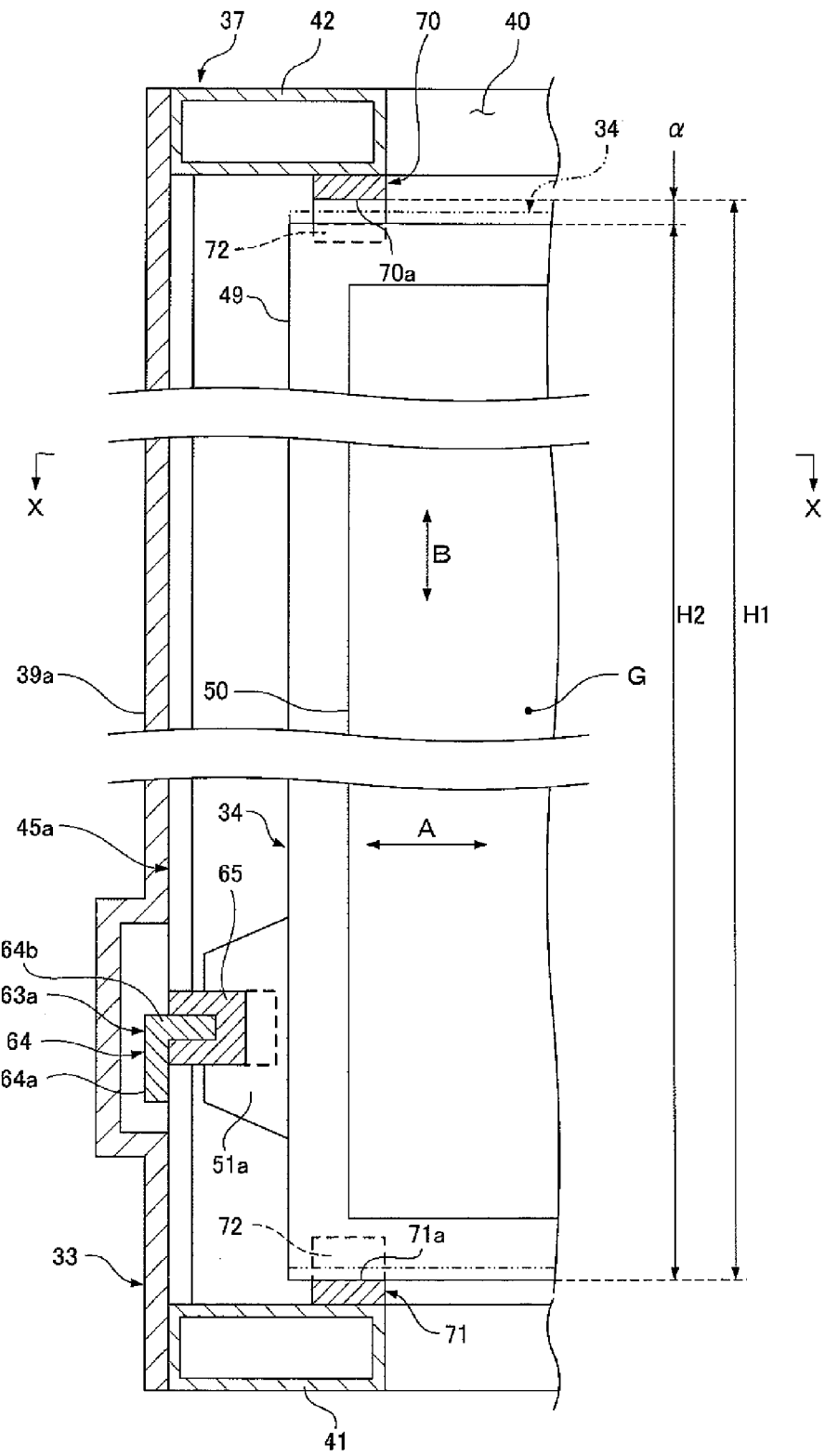
FIG. 16 is a longitudinal sectional view of left or right one side of the casing and left or right one side of the membrane cartridge of a submerged membrane separator in a sixth embodiment of the present invention.

Next, a sixth embodiment in the present invention is explained with reference to FIG. 16.

The sixth embodiment is a modification of the first embodiment. Left and right side plates 51a and 51b of a membrane cartridge 34 are provided in a pair in positions lower than the center of gravity G of the membrane cartridge 34. Similarly, left and right lifting suppressing members 63a and 63b are also provided in a pair in positions lower than a center of gravity G of the membrane cartridge 34.

Consequently, during a filtration operation, the membrane cartridge 34 minutely vibrates while being kept in a state in which the membrane cartridge 34 is lifted within the range of a space α in an up-down direction B by upflow 77 generated when air diffusion is performed from an air diffuser 36. At this point, since the side plates 51a and 51b of the membrane cartridge 34 and the lifting suppressing members 63a and 63b are respectively provided in the positions lower than the center of gravity G of the membrane cartridge 34, the vibration of the membrane cartridge 34 is facilitated.

In the sixth embodiment, the side plates 51a and 51b of the membrane cartridge 34 and the lifting suppressing members 63a and 63b are respectively provided in the positions lower than the center of gravity G of the membrane cartridge 34. However, the side plates 51a and 51b of the membrane cartridge 34 and the lifting suppressing members 63a and 63b may be provided in positions at the same height as the center of gravity G of the membrane cartridge 34.

Next, a seventh embodiment in the present invention is explained with reference to FIGS. 17 to 19.

A filtration membrane 50 of a membrane cartridge 34 is divided into upper and lower portions 91 and 92. A boundary portion where the upper portion 91 and the lower portion 92 are adjacent to each other is welded to a filtration plate 49. Consequently, a welded portion 93 is formed over the entire width of the filtration membrane 50 in the boundary portion in the vertical center of the filtration membrane 50.

Two water intake nozzles 53a and 53b for sucking treated water obtained by the membrane filtration 50 are provided in the filtration plate 49. The upper water intake nozzle 53a is provided on one of the left and right sides of the filtration plate 49 and at the upper end of the upper portion 91. The lower water intake nozzle 53b is provided on one of the left and right sides of the filtration plate 49 and at the upper end of the lower portion 92.

Upper and lower water collecting pipes 55a and 55b for collecting treated water sucked from the water intake nozzles 53a and 53b are provided in a pair on one side of a frame body 37 of a casing 33. The upper water collecting pipe 55a and the upper water intake nozzle 53a are connected via a connection pipe 56 and the lower water collecting pipe 55b and the lower water intake nozzle 53b are connected via the connection pipe 56.

Both side covers 39a and 39b are respectively divided into two as an upper side cover body 97 and a lower side cover body 98. The upper and lower side cover bodies 97 and 98 are respectively detachably attached to the frame body 37 by bolts 46.

Consequently, during a filtration operation, the inner side of the membrane cartridge 34 is depressurized while air diffusion is performed from an air diffuser 36, whereby sludge or the like in a liquid to be treated 47 is caught by the filtration membrane 50 of the membrane cartridge 34. Permeate permeating through the filtration membrane 50 and flowing into the inner side of the membrane cartridge 34 is collected in the water collecting pipes 55a and 55b from the water intake nozzles 53a and 53b through the connection pipes 56.

In this case, upflow 77 is generated among the membrane cartridges 34 by bubbles of air diffused from the air diffuser 36. Matters adhering to the membrane surfaces of the membrane cartridges 34 are removed by the upflow 77.

The upper water intake nozzle 53a is provided at the upper end of the upper portion 91 and the lower water intake nozzle 53b is provided at the upper end of the lower portion 92. Therefore, it is possible to surely collect treated water from the entire region in the portions 91 and 92 and prevent air pocket from occurring in the portions 91 and 92.

Figure 19A:
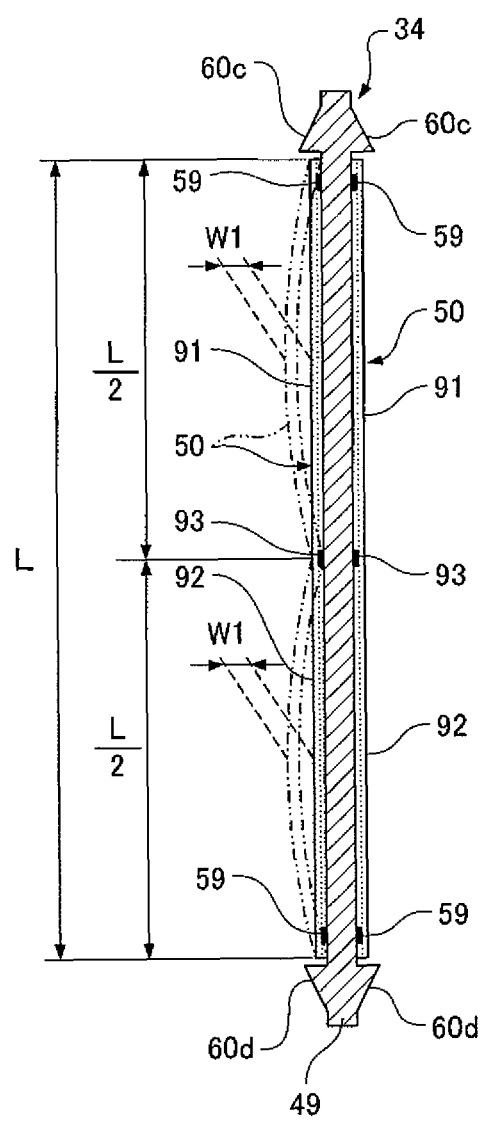
FIG. 19A is a longitudinal sectional view of the membrane cartridge of the submerged membrane separator in the seventh embodiment, and shows a filtration membrane divided into upper and lower portions.
Figure 19B:
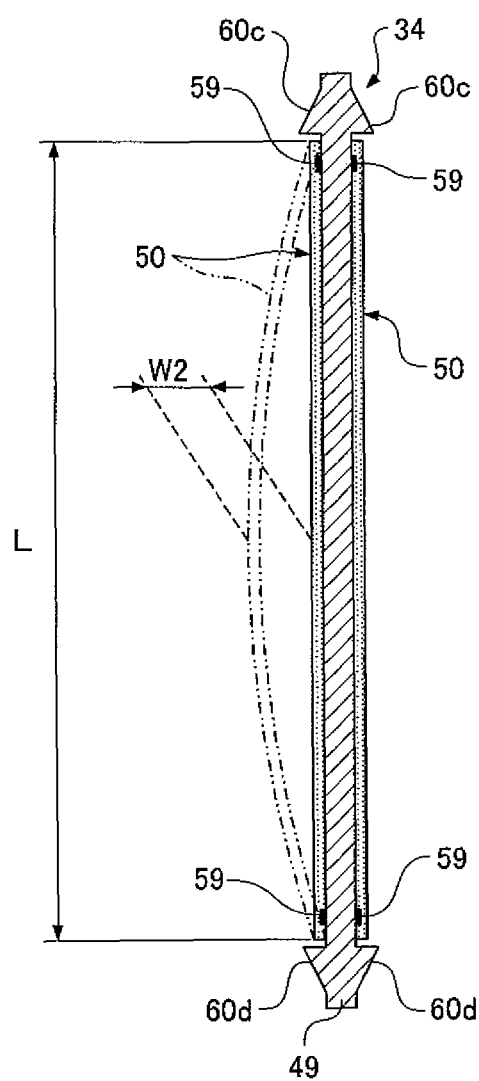
FIG. 19B is a longitudinal sectional view of the membrane cartridge of the submerged membrane separator in the seventh embodiment, and shows the filtration membrane not divided.

When the upflow 77 flows along the filtration membrane 50, the filtration membrane 50 vibrates in the thickness direction with respect to the filtration plate 49 due to the force of the upflow 77. As shown in FIG. 19A, the height L of the filtration membrane 50 is divided vertically into upper and lower halves (i.e., L/2) by the portions 91 and 92. Therefore, a width W1 of the filtration membrane 50 vibrating in the thickness direction in each of the portions 91 and 92 is small compared with a width W2 of the filtration membrane 50, in which the portions 91 and 92 are not formed as shown in FIG. 19B, vibrating in the thickness direction (W1<W2). Consequently, it is possible to prevent the filtration membrane 50 from being damaged and extend the life of the filtration membrane 50. Virtual lines in FIGS. 19A and 19B exaggeratingly indicate a state in which the filtration membrane 50 vibrates. Actually, the widths W1 and W2 of vibration of the filtration membrane 50 are extremely small.

In the seventh embodiment, the filtration membrane 50 is divided into the two portions 91 and 92 by welding the vertical center of the filtration membrane 50 to the filtration plate 49 over the entire width. However, the filtration membrane 50 may be divided into the two portions 91 and 92 by providing ribs in the filtration plate 49.

Figure 17:
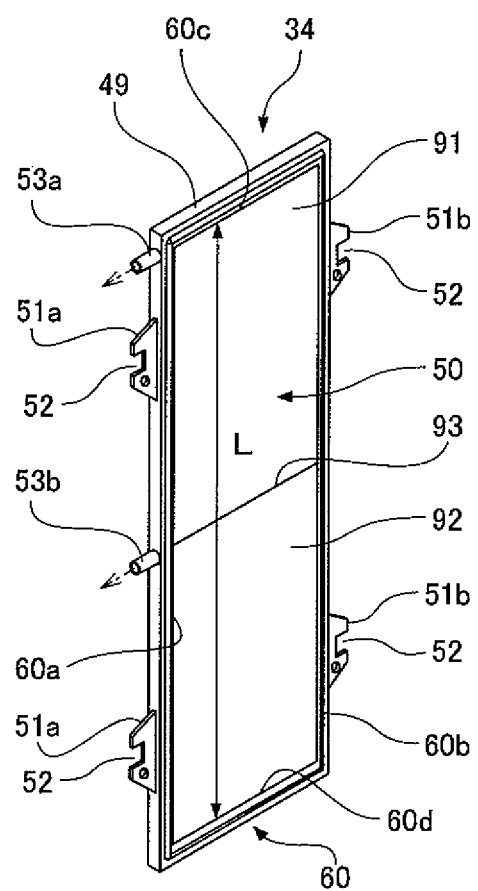
FIG. 17 is a perspective view of the membrane cartridge of a submerged membrane separator in a seventh embodiment of the present invention.
Figure 18:
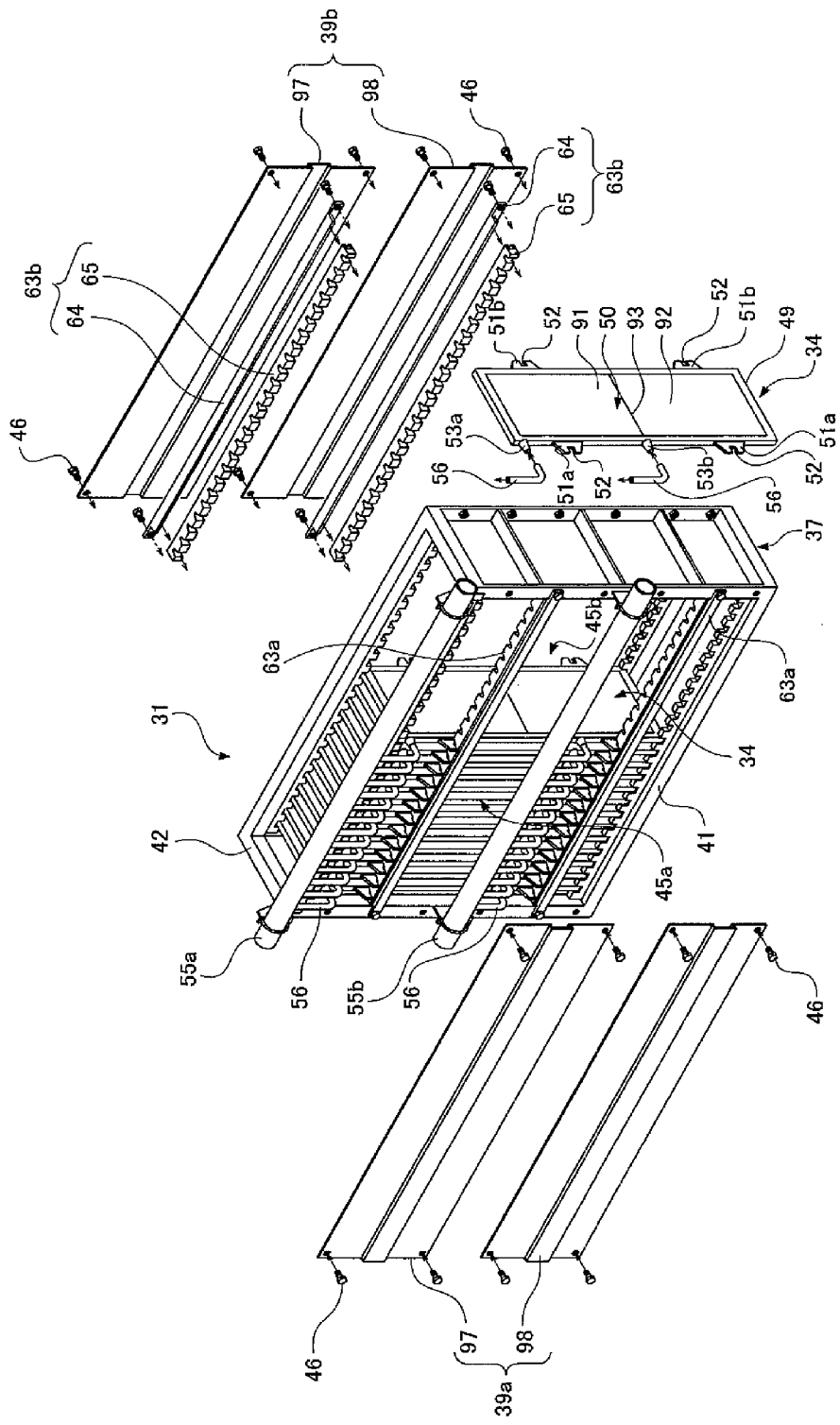
FIG. 18 is an exploded perspective view showing the configuration of the submerged membrane separator in the seventh embodiment.
Figure 20:
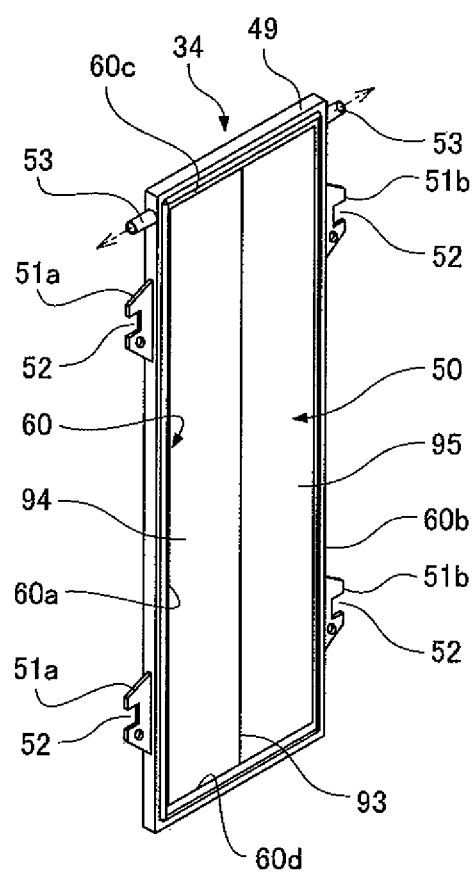
FIG. 20 is a perspective view of the membrane cartridge of a submerged membrane separator in an eighth embodiment of the present invention.
Figure 21:
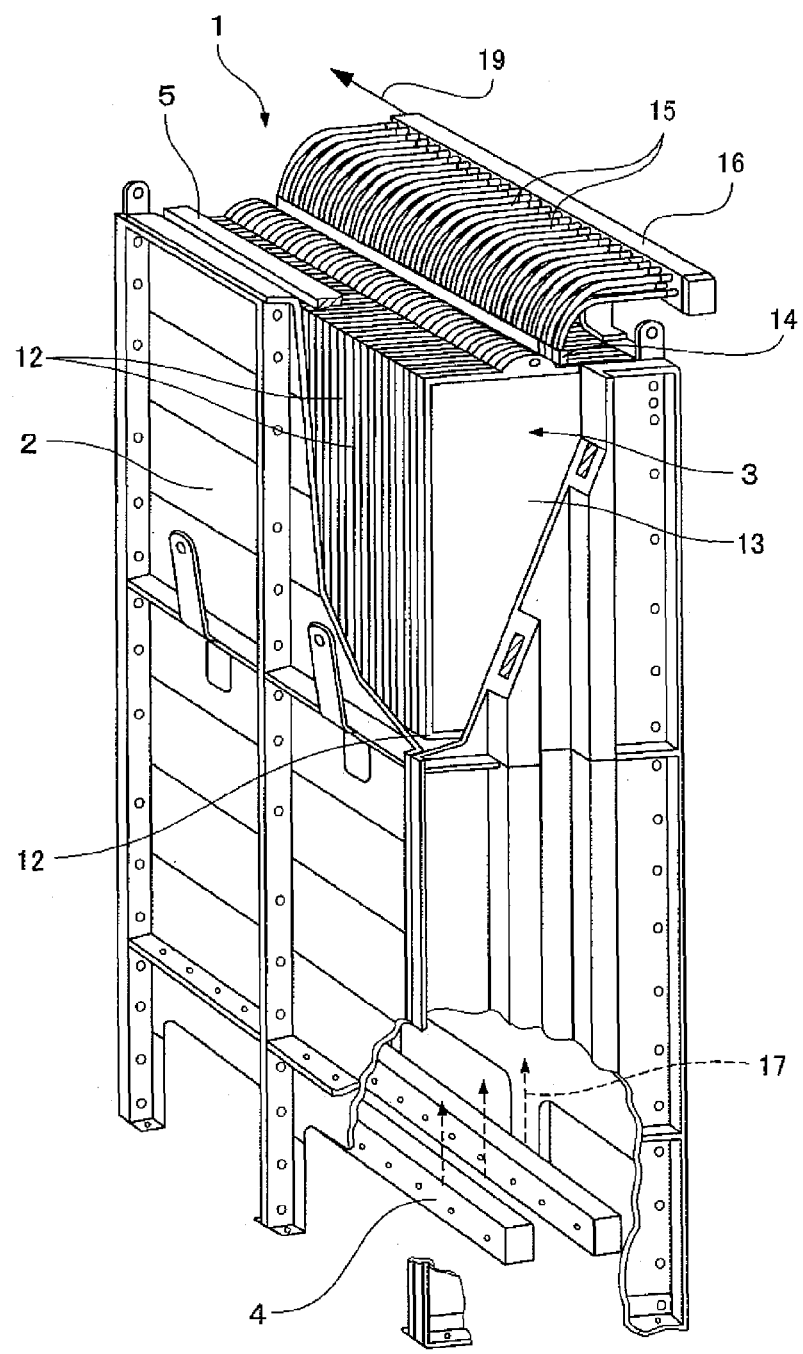
FIG. 21 is a partially cut-out perspective view of a submerged membrane separator in a prior art.
Figure 22A:
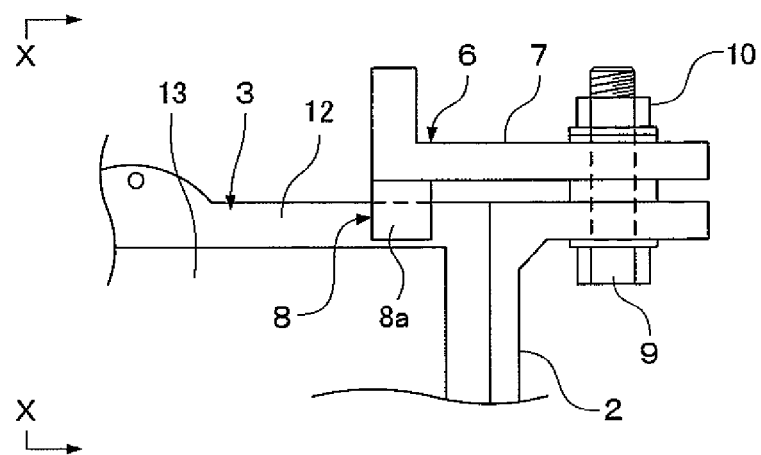
FIG. 22A is a front view of the pressing plate of the submerged membrane separator in the prior art.
Figure 22B:
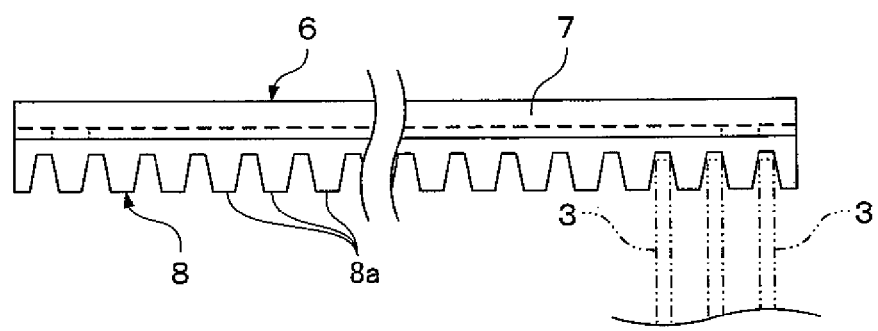
FIG. 22B is a view taken along arrows X-X in FIG. 22A.

In the seventh embodiment, as shown in FIG. 17, the filtration membrane 50 is divided into the upper and lower portions 91 and 92. However, the filtration membrane 50 may be divided vertically into three or more portions. As an eighth embodiment, as shown in FIG. 20, the filtration membrane 50 may be divided into left and right portions 94 and 95 or may be divided horizontally into three or more portions.

The invention claimed is:

1. A submerged membrane separator comprising: a casing opened at a top; a plurality of flat membrane cartridges arrayed at intervals in the casing; and an air diffuser provided below the membrane cartridges, wherein
   the membrane cartridges are arrayed without contacting adjacent membrane cartridges,
   the membrane cartridges are movably held in an up-down direction in the casing while having a space in the up-down direction between an upper end of the membrane cartridge and the casing,
   a lifting suppressing member for restricting a lifting amount of the membrane cartridges to be smaller than the space in the up-down direction is provided in the casing,
   the membrane cartridges are supported by the lifting suppressing member and can be lifted individually by an upward flow generated by diffused air from the air diffuser,
   the lifting amount of the membrane cartridges is restricted by the lifting suppressing member to be larger than zero and smaller than the space in the up-down direction, and
   when the air diffusion by the air diffuser is stopped, the weight of the lifted membrane cartridges causes the membrane cartridges to move downward such that the space in the up-down direction is formed between the upper end of the membrane cartridge and the casing.

2. The submerged membrane separator according to claim 1, wherein the membrane cartridges are movably held in an array direction of the membrane cartridges in the casing.

3. The submerged membrane separator according to claim 1, wherein the lifting suppressing member restricts the lifting amount of the membrane cartridges in a side portion of the membrane cartridges.

4. The submerged membrane separator according to claim 1, wherein the lifting suppressing member restricts the lifting amount of the membrane cartridges in a lower side portion of the membrane cartridges.

5. The submerged membrane separator according to claim 1, wherein the lifting suppressing member restricts the lifting amount of the membrane cartridges in an upper side portion of the membrane cartridges.

6. The submerged membrane separator according to claim 1, wherein the lifting suppressing member holds spaces between the membrane cartridges.

7. The submerged membrane separator according to claim 1, wherein a portion of the lifting suppressing member that comes into contact with the membrane cartridges is an elastic member.

8. The submerged membrane separator according to claim 3, wherein
   a fitting portion is provided in the side portion of the membrane cartridges, and
   the lifting suppressing member fits in the fitting portion.

9. The submerged membrane separator according to claim 3, wherein an engaging portion is provided in the side portion of the membrane cartridges, and
   the engaging portion engages with the lifting suppressing member from below during a filtration operation.

10. The submerged membrane separator according to claim 1, wherein the lifting suppressing member is attached to a frame body of the casing.

11. The submerged membrane separator according to claim 3, wherein the lifting suppressing member is attached to a side panel that surrounds both sides of the membrane cartridges.

* * * * *